US011178166B2

(12) United States Patent
Al Faruque et al.

(10) Patent No.: US 11,178,166 B2
(45) Date of Patent: *Nov. 16, 2021

(54) INFORMATION LEAKAGE-AWARE COMPUTER AIDED CYBER-PHYSICAL MANUFACTURING

(71) Applicant: The Regents of the University of California, Oakland, CA (US)

(72) Inventors: Mohammad Abdullah Al Faruque, Irvine, CA (US); Jiang Wan, Irvine, CA (US); Sujit Rokka Chhetri, Irvine, CA (US); Sina Faezi, Irvine, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 290 days.

This patent is subject to a terminal disclaimer.

(21) Appl. No.: 16/369,993

(22) Filed: Mar. 29, 2019

(65) Prior Publication Data
US 2019/0230113 A1      Jul. 25, 2019

Related U.S. Application Data

(60) Continuation-in-part of application No. 16/244,390, filed on Jan. 10, 2019, now Pat. No. 10,511,622, (Continued)

(51) Int. Cl.
*H04L 29/06* (2006.01)
*G06F 21/60* (2013.01)
(Continued)

(52) U.S. Cl.
CPC .......... *H04L 63/1433* (2013.01); *B33Y 50/02* (2014.12); *B33Y 99/00* (2014.12);
(Continued)

(58) Field of Classification Search
CPC . H04L 63/1433; H04L 63/1466; G06F 21/10; G06F 21/554; G06F 21/608; B33Y 50/02; B33Y 99/00
(Continued)

(56) References Cited

U.S. PATENT DOCUMENTS 4,370,721 A * 1/1983 Berenberg .......... G05B 19/4083
318/572
5,754,657 A * 5/1998 Schipper ................. G01S 19/16
342/357.29
(Continued)

OTHER PUBLICATIONS

Carlet et al., Achieving side-channel high-order correlation immunity with leakage squeezing, Springer (Year: 2014).*
(Continued)

*Primary Examiner* — Noura Zoubair
*Assistant Examiner* — Mahabub S Ahmed
(74) *Attorney, Agent, or Firm* — Nguyen Tarbet LLC

(57) ABSTRACT

A methodology as described herein allows cyber-domain tools such as computer aided-manufacturing (CAM) to be aware of the existing information leakage. Then, either machine process or product design parameters in the cyber-domain are changed to minimize the information leakage. This methodology aids the existing cyber-domain and physical-domain security solution by utilizing the cross-domain relationship.

1 Claim, 20 Drawing Sheets
(18 of 20 Drawing Sheet(s) Filed in Color)

Related U.S. Application Data which is a division of application No. 15/438,997, filed on Feb. 22, 2017, now Pat. No. 10,212,185, application No. 16/369,993, which is a continuation-in-part of application No. 15/439,458, filed on Feb. 22, 2017, now abandoned.

(60) Provisional application No. 62/298,091, filed on Feb. 22, 2016.

(51) Int. Cl.
| | |
|---|---|
| B33Y 99/00 | (2015.01) |
| G06F 21/55 | (2013.01) |
| G06F 21/10 | (2013.01) |
| B33Y 50/02 | (2015.01) |

(52) U.S. Cl.
CPC ............ *G06F 21/10* (2013.01); *G06F 21/554* (2013.01); *G06F 21/608* (2013.01); *H04L 63/1466* (2013.01)

(58) Field of Classification Search
USPC ..................................................... 726/22–25
See application file for complete search history.

(56) References Cited

U.S. PATENT DOCUMENTS

| | | | | |
|---|---|---|---|---|
| 6,873,913 | B2* | 3/2005 | Choo ...................... | G01V 1/28 702/17 |
| 8,315,124 | B2* | 11/2012 | Zhu ........................ | G01V 1/364 367/73 |
| 9,694,544 | B2* | 7/2017 | Mark ..................... | B29C 64/393 |
| 9,978,177 | B2* | 5/2018 | Mehr ..................... | G06F 17/10 |
| 10,894,399 | B2* | 1/2021 | Ravich .................. | B29C 64/393 |
| 2003/0032214 | A1* | 2/2003 | Huang ................... | B29C 64/112 264/435 |
| 2004/0083023 | A1* | 4/2004 | Suh ...................... | G05B 19/40931 700/187 |
| 2004/0151978 | A1* | 8/2004 | Huang ................... | H01F 1/009 429/83 |
| 2006/0156978 | A1* | 7/2006 | Lipson ................... | A61L 27/20 118/708 |
| 2007/0238957 | A1* | 10/2007 | Yared ................... | A61B 5/0035 600/407 |
| 2011/0093114 | A1* | 4/2011 | Tsai ..................... | G05B 19/4103 700/191 |
| 2013/0037993 | A1* | 2/2013 | Chen ...................... | B29B 13/08 264/401 |
| 2013/0095302 | A1* | 4/2013 | Pettis ................... | B29C 64/106 428/195.1 |
| 2014/0288893 | A1* | 9/2014 | Blom ..................... | G06F 30/23 703/1 |
| 2014/0374933 | A1* | 12/2014 | Flitsch ................. | B29C 64/118 264/36.1 |
| 2015/0054204 | A1* | 2/2015 | Tseliakhovich ....... | B29C 64/153 264/489 |
| 2015/0074159 | A1* | 3/2015 | Poschmann ............ | G09C 1/00 708/270 |
| 2015/0112472 | A1* | 4/2015 | Chen ..................... | B29C 64/118 700/119 |
| 2015/0165691 | A1* | 6/2015 | Mark ..................... | B29C 64/386 700/98 |
| 2015/0235143 | A1* | 8/2015 | Eder ..................... | G16H 50/50 706/12 |
| 2015/0381351 | A1* | 12/2015 | Kuenemund ........... | H04L 9/003 713/189 |
| 2016/0170387 | A1* | 6/2016 | Ihara .................... | H04N 1/60 700/119 |
| 2016/0176117 | A1* | 6/2016 | Lee ....................... | B33Y 50/00 700/98 |
| 2016/0184893 | A1* | 6/2016 | Dave ..................... | B29C 64/393 419/53 |
| 2016/0221114 | A1* | 8/2016 | Dietrich ................. | B29C 64/10 |
| 2016/0258209 | A1* | 9/2016 | Berman ................. | G05B 15/02 |
| 2016/0263832 | A1* | 9/2016 | Bui ....................... | B29C 64/141 |
| 2016/0263833 | A1* | 9/2016 | Vittitow ................. | B22F 10/30 |
| 2016/0325496 | A1* | 11/2016 | Pena ..................... | B29C 64/40 |
| 2017/0015057 | A1* | 1/2017 | Stevens ................ | B29C 64/386 |
| 2017/0021570 | A1* | 1/2017 | Sugiura ................. | G06F 30/00 |
| 2017/0032281 | A1* | 2/2017 | Hsu ...................... | B23K 31/125 |
| 2017/0203515 | A1* | 7/2017 | Bennett ................. | B29C 64/232 |
| 2017/0207926 | A1* | 7/2017 | Gil ........................ | H04W 4/70 |
| 2017/0248937 | A1* | 8/2017 | Guimbretiere ......... | B29C 64/386 |
| 2017/0270434 | A1* | 9/2017 | Takigawa ............... | B23K 26/21 |
| 2017/0312821 | A1* | 11/2017 | DeFelice ............. | B23K 26/0093 |
| 2018/0075371 | A1* | 3/2018 | Lobachev .............. | G06N 20/00 |
| 2018/0095450 | A1* | 4/2018 | Lappas .................. | B33Y 10/00 |
| 2018/0111320 | A1* | 4/2018 | Zhao .................... | B29C 64/165 |
| 2018/0120813 | A1* | 5/2018 | Coffman ................. | G06F 30/00 |
| 2018/0188658 | A1* | 7/2018 | Van Der Post ...... | G03F 7/70625 |
| 2018/0321666 | A1* | 11/2018 | Cella .................... | G05B 23/0286 |
| 2019/0042773 | A1* | 2/2019 | Zhang ................... | B33Y 50/00 |
| 2019/0143412 | A1* | 5/2019 | Buller .................... | B23K 15/02 219/76.12 |

OTHER PUBLICATIONS

Zhu et al., Context-free Attacks Using Keyboard Acoustic Emanations, CCS'14, Nov. 3-7, 2014, Scottsdale, Arizona, USA. (Year: 2014).*

Backes, et al., Acoustic Side-Channel Attacks on Printers, 2010 Usenix Security Conference (Year: 2010).*

Bayrak et al., An EDA-Friendly Protection Scheme against Side-Channel Attacks, 2013 EDAA (Year: 2013).*

Ong et al., An Internet-Based Virtual CNC Milling System, Springer (Year: 2002).*

Usenix, Proceeding of 19th Usenix Security Symposium, Usenix (Year: 2010).*

Frankland, Side Channels, Compromising Emanations and Surveillance: Current and future technologies, University of London (Year: 2011).*

Almeida et al., Formal verification of side-channel countermeasures using self-composition, Elsevier (Year: 2011).*

Asonov et al., Keyboard Acoustic Emanations, Proceedings of the 2004 IEEE Symposium on Security and Privacy (S&P'04) (Year: 2004).*

Demme et al., Side-channel Vulnerability Factor: A Metric for Measuring Information Leakage, 2012 IEEE (Year: 2012).*

Hemmati et al., Roller bearing acoustic signature extraction by wavelet packet transform, applications in fault detection and size estimation, Elsevier (Year: 2015).*

Vincent et al., Trojan Detection and Side-Channel Analyses for Cyber-Security in Cyber-Physical Manufacturing Systems, Elsevier (Year: 2015).*

H. Lipson,"3D Printing, Now and Beyond," Stratasys, www.stratasys. com, 2015.

B. Krassenstein, "New Airbus A350 XWB aircraft contains over 1,000 3D printed parts." 3Dprint, https://3dprint.com, 2015.

S. D. Applegate, "The dawn of kinetic cyber," in Cyber Conflict (CyCon), 2013 5th International Conference on, pp. 1-15, IEEE, 2013.

N. Falliere et al., "W32. stuxnet dossier," White paper, Symantec Corp., Security Response, vol. 5, 2011.

J. Slay and M. Miller, Lessons learned from the maroochy water breach. Springer, 2007.

R. M. Lee et al., "German steel mill cyber attack", Industrial Control Systems, vol. 30, 2014.

K. Koscher et al., "Experimental security analysis of a modem automobile," in Security and Privacy (SP), 2010 IEEE Symposium on, pp. 447-462, IEEE, 2010.

L. Sturm et al., "Cyber-physical vulnerabilities in additive manufacturing systems," Context, 2014.

M. AL Faruque et al., "Design methodologies for securing cyber-physical systems," in Proceedings of the 10th International Conference on Hardware/Software Codesign and System Synthesis, 2015.

(56) References Cited

OTHER PUBLICATIONS

J. Wan et al., "Exploiting wireless channel randomness to generate keys for automotive cyber-physical system security," in 2016 ACM/IEEE 7th International Conference on Cyber-Physical Systems (ICCPS), pp. 1-10, IEEE, 2016.

R. Mitchell and I.-R. Chen, "A survey of intrusion detection techniques for cyber-physical systems," ACM Computing Surveys (CSUR), 2014.

H. Vincent et al., "Trojan detection and side-channel analyses for cyber-security in cyber-physical manufacturing systems," Procedia Manufacturing, vol. 1, pp. 77-85, 2015.

M. Yampolskiy et al., "Security challenges of additive manufacturing with metals and alloys," in Critical Infrastructure Protection IX, Springer, 2015.

J. C. Jensen et al., "A Model-Based Design Methodology for Cyber-Physical Systems," in Wireless Communications and Mobile Computing Conference (IWCMC), IEEE, 2011.

R. Kothamasu et al., "System health monitoring and prognostics—a review of current paradigms and practices," in Handbook of Maintenance Management and Engineering, pp. 337-362, Springer, 2009.

M. P. Groover, Automation, production systems, and computer-integrated manufacturing. Prentice Hall Press, 2007.

M. AL Faruque et al., "Acoustic side-channel attacks on additive manufacturing systems," in ACM, 2016.

H. Debar, M. Dacier, and A. Wespi, "Towards a taxonomy of intrusion-detection systems," Computer Networks, vol. 31, No. 8, pp. 805-822, 1999.

A. Cardenaset et al.., "Challenges for securing cyber physical systems," in Workshop on future directions in cyber-physical systems security, p. 5, 2009.

J. Hendershot, "Causes and sources of audible noise in electrical motors," in Incremental Motion Control Systems and Devices Symposium, 1993.

"k-quad 5.1 250mm quadcopter frame." Thingiverse, http://www.thingiverse.com/thing:397036, 2014.

Non-Final Office Action Issued for U.S. Appl. No. 15/439,458 dated Nov. 29, 2018.

\* cited by examiner

INFORMATION LEAKAGE-AWARE COMPUTER AIDED CYBER-PHYSICAL MANUFACTURING

CROSS-REFERENCES TO RELATED APPLICATIONS

This application is a continuation-in-part, and claims benefit of U.S. patent application Ser. No. 15/439,458, filed Feb. 22, 2017, the specification of which is incorporated herein in its entirety by reference.

This application is a continuation-in-part, and claims benefit of U.S. patent application Ser. No. 16/244,390, filed Jan. 10, 2019, which is a divisional of U.S. patent application Ser. No. 15/438,997, filed Feb. 22, 2017, now U.S. Pat. No. 10,212,185, which claims benefit to provisional U.S. Patent Application No. 62/298,091, filed Feb. 22, 2016, the specifications of which are incorporated herein in its entirety by reference.

STATEMENT REGARDING FEDERALLY SPONSORED RESEARCH OR DEVELOPMENT

This invention was made with government support under Grant No. CNS 1546993 awarded by NSF. The government has certain rights in the invention.

BACKGROUND OF THE INVENTION

Field of the Invention

The present invention relates to methods for protecting cyber-physical additive manufacturing systems from information leakage. More specifically, the present invention relates to methods of estimating G-codes of cyber-physical additive manufacturing systems.

Background Art

In AM systems, objects are created layer by layer. Different types of AM vary according to the materials used and the technology incorporated for fusing the layers. Fused Deposition Modeling (FDM) is a common technology used in AM, where thermoplastic heated slightly above its melting point is deposited layer by layer to form a 3D object. It has been forecasted that 5.6 million 3D Printers will be shipped worldwide by 2019. High-end FDM based 3D Printers are already used in diverse fields such as automotive, aerospace, and medical devices. For example, Airbus 350 is currently flying with more than 1000 3D Printed parts. With its widespread in various fields, it is clear that existing security issues prevalent in Cyber-Physical Systems (CPS) will eventually affect AM as well. The major concern will arise due to kinetic cyber-attacks, which can cause physical damage, injury, or even death due to attacks originating in the cyber domain. In CPS, effects of kinetic cyber-attacks have been recently highlighted by incidents such as the Stuxnet malware, Maroochy water breach, German steel mill cyber-attack, and security breaches in automobiles. In AM, kinetic cyber-attack can find its way through the digital process chain to introduce various inconspicuous flaws in the 3D objects. If these objects are critical for the system, they can compromise the structural integrity and pose severe safety risk. For example, an inconspicuous void (less than 1 mm in dimension) placed in the 3D design of an American Society for Testing and Materials standard D638-10 tensile test specimen reduced its mechanical strength to carry load by 14%.

In FDM-based 3D Printers, the digital process chain comprises various steps. The first step is to design the 3D object using Computer Aided Design (CAD) tools. This CAD model is then converted to Stereolithograhy (STL) format, which uses a series of triangles to model the surface geometry. Conversion to STL format is automatically done by the CAD software. Slicing algorithms are used to convert the STL file into G/M-code which comprises layer by layer description of the 3D model. G/M-code is machine specific and the AM machine's firmware can convert it to corresponding control signals to actuate the various physical components. G-codes are responsible for handling the motion while printing. Each G-code is responsible for determining the speed of printing along different axis, as well as the extrusion amount to be deposited in each printing step. As an example, G1 F2100 X5 Y6 Z1.2 E2.1 represents a single line of G-code for controlling the movement of the nozzle, where G1 means coordinated linear motion, F defines travel feed rate (speed) which is measured in mm/min, and distance and extrusion are measured in mm. The M-codes are used for controlling the machine settings such as temperature, coolant, etc.

The security concerns in CPS are not new; in fact, various attack detection methods have been designed for the identification and detection of attacks. However, attack detection for cyber-physical AM systems have not received much attention. Researchers present the potential attack vectors for an AM digital process chain and recommend securing the process chain by incorporating software checks, hashing, and process monitoring through side-channels. Signature based attack detection methods leverage the concept of integrated circuit Trojan detection from side-channel analysis. However, these signature based techniques require acquiring the signature of a baseline structure every time it is created, which is counter-intuitive to the rapid prototyping nature of AM systems. In contrast, the present invention uses statistical modeling of the AM system to detect an anomalous analog emission arising from an attack in order to detect an attack.

The fundamental motivation for the detection method of the present invention, also referred to herein as Kinetic Cyber-Attack Detection ("KCAD") method, comes from the fact that in CPS, the information flow in the cyber domain has at least one corresponding signal flow in the physical domain. These signals in the physical domain actuate the physical processes, and this actuation converts energy from one form to another. This phenomenon allows for monitoring of the unintentionally leaked analog emissions that have high mutual information with the corresponding control signals. Analog emissions have been used in system health monitoring and prognostics to infer information about the current state of the system. These emissions have also been used in quality control in manufacturing. However, traditional quality control systems focus only on measuring key quality characteristics, thus a kinetic cyber-attack to breach the confidentiality of the system via emissions produced by other features may not be detected. By incorporating the present statistical method, the acquired analog emissions from the side-channel corresponding to the control signals can be used to model the behavior of the system. Further still, this method may be used for detecting an intrusion in the system.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF SUMMARY OF THE INVENTION

Cyber-physical additive manufacturing systems consist of tight integration of cyber and physical domains. This union, however, induces new cross-domain vulnerabilities that pose unique security challenges. One of these challenges is preventing confidentiality breach, caused by physical-to-cyber domain attacks. In this form of attack, attackers utilize the side-channels (such as acoustics, power, electromagnetic emissions, and so on) in the physical-domain to estimate and steal cyber-domain data (such as G/M-codes). Since these emissions depend on the physical structure of the system, one way to minimize the information leakage is to modify the physical-domain. However, this process can be costly due to added hardware modification. Instead, the present invention features a novel methodology that allows the cyber-domain tools [such as computer aided-manufacturing (CAM)] to be aware of the existing information leakage. Then, either machine process or product design parameters in the cyber-domain are changed to minimize the information leakage. This methodology aids the existing cyber-domain and physical-domain security solution by utilizing the cross-domain relationship. The methodology has been implemented in a fused-deposition modeling-based Cartesian additive manufacturing system. The methodology achieves reduction of mutual information by 24.94% in acoustic side-channel, 32.91% in power side-channel, 32.29% in magnetic side-channel, and 55.65% in vibration side-channel. As a case study, to help understand the implication of mutual information drop, the calculation of success rate and the reconstruction of the 3D object based on an attack model have also been presented. For the given attack model, the leakage-aware CAM tool decreases the success rate of an attacker by 8.74% and obstructs the reconstruction of finer geometry details.

According to some embodiments, the present invention features systems and methods for detecting an attack of a cyber-physical additive manufacturing ("AM") system. The AM system may comprise a cyber-domain having a G-code and a physical domain having a manufacturing machine. In some embodiments, an attack on the AM system comprises acquiring and processing an analog emissions signal emanating from a side channel of the manufacturing machine in order to derive the G-code. The present detection method may be applied via an algorithm integrated at any step in the AM system process chain to detect an attack.

In one embodiment, a detection system for detecting an attack of a cyber-physical additive manufacturing ("AM") system may comprise one or more analog emissions sensors operatively coupled to the manufacturing machine, configured for acquiring the analog emissions signal emanating from one or more side channels of the manufacturing machine; a processor, operatively coupled to the one or more analog emissions sensors; and a memory operatively coupled to the processor, configured to store digitally-encoded instructions that, when executed by processor, cause the processor to perform operations. In some embodiments, these operations may comprise the steps of the following method.

In one embodiments, the method, or the operations executed by the processor may comprise obtaining the analog emissions signal from one or more side channels of the manufacturing machine; acquiring a set of original control signals from the G-code, wherein the set of original control signals are parameters defined in the G-code, wherein each original control signal has an original signal value, wherein each original control signal has one or more corresponding signal flows in the physical domain via the manufacturing machine, wherein each corresponding signal flow produces one or more analog emissions that contributes to the analog emissions signal; extracting a set of control parameters, herein referred to as a set of extracted control signals, from the analog emissions signal, wherein each extracted control signal corresponds to one of the original control signals defined in the G-code; computing an estimation function $\hat{f}_i$ for each extracted control signal i, wherein $\hat{f}_i$ is an estimation of $f_i$ and is generated by a supervised learning approach, wherein $f_i$ relates each extracted control signal i to the analog emission corresponding to said extracted control signal i, wherein the set of extracted control signals is used as a data training set by the supervised learning approach to compute $\hat{f}_i$ for each extracted control signal; obtaining a subsequent analog emissions signal from the one or more side channels of the manufacturing machine, wherein the subsequent analog emissions signal is fed to the estimation function $\hat{f}_i$; extracting a set of subsequent extracted control signals from the subsequent analog emissions signal using the estimation function $\hat{f}_i$; defining an error threshold for each original control signal; and calculating an absolute value of a difference between the subsequent extracted control signal and the original control signal corresponding to said subsequent extracted control signal.

Determining if an attack is in process comprises comparing each extracted control signal to each original control signal to detect the presence of an alteration. If the absolute value is outside of the error threshold defined for said original control signal, then the attack is detected.

In other embodiments, the analog emissions signal is pre-processed to remove noise. In further embodiments, a statistical procedure is applied to the set of extracted control signals in order to reduce the amount of information in the set of extracted control signals. Without wishing to limit the invention to a particular theory or mechanism, this can effectively improve processing time. In some embodiments, the statistical procedure utilized is Principal Component Analysis.

In some embodiments, the estimation function may be generated by a supervised learning approach employing the set of extracted control signals as a data training set. Non-limiting examples of the supervised learning approach include: Gradient Boosting Regressor, Ridge Regression, Stochastic Gradient Descent Regression, Bayesian Ridge Regression, Passive Aggressive Regression, Decision Tree Regression, Elastic Net Regression, Linear Regression with Lasso or k-Nearest Neighbor Regression, used individually or in combination.

In one embodiment, during an initial execution of the G-code, the analog emissions signal is acquired by the one or more analog emissions sensors, the extracted control signal is extracted from the analog emissions signal and a relationship between each original control signal and the corresponding extracted control signal is estimated as the estimation function $\hat{f}_i$. The analog emissions signal is continuously acquired from the side channel of the manufacturing machine, and each extracted control signal is therefore also continuously updated.

During subsequent acquisitions of the analog emissions signal, the subsequent analog emissions signal is fed to the estimation function $\hat{f}_i$ to obtain the set of subsequent extracted control signals. During the attack, the subsequent analog emissions signal is measurably altered, and consequently, each subsequent extracted control signal is altered. Each subsequent extracted control signal is compared to the corresponding original control signal, and if the absolute value of the difference between the subsequent extracted control signal and the original control signal is outside of the error threshold defined for said original signal, then the attack is detected.

In other embodiments, the detection system may further comprise an interpreter configured for converting the G-code to canonical machining commands to be read and executed by the manufacturing machine.

In still other embodiments, the AM system may further comprise a stereolithography ("STL") module configured to store one or more STL files. A computer aided design of the 3D object is converted to the one or more STL files, and a slicing algorithm converts the one or more STL files into G-code.

The currently existing systems and methodologies have inherent limitations and as such they cannot statistically model the behavior of an AM system and utilize the model for detecting an intrusion.

Without wishing to limit the invention to any theory or mechanism, it is believed that the present invention is capable of detecting an attack of an AM system because of the following non-limiting inventive features:

1. one or more analog emissions sensors for continuously acquiring analog emissions emanating from the manufacturing machine;
2. a detection model of the AM system generating an estimation function, which estimates a relationship between the analog emissions signal and the design variables defined in the G-code; and
3. the detection model further configured to extract current design variables by feeding the analog emissions into the estimation function and determining an attack by comparing the design variables defined in the G-code to the extracted current design variables.

BRIEF DESCRIPTION OF SEVERAL VIEWS OF THE DRAWINGS

This patent application contains at least one drawing executed in color. Copies of this patent or patent application publication with color drawing(s) will be provided by the Office upon request and payment of the necessary fee.

The features and advantages of the present invention will become apparent from a consideration of the following detailed description presented in connection with the accompanying drawings in which.

DETAILED DESCRIPTION OF THE INVENTION

Figure 1:
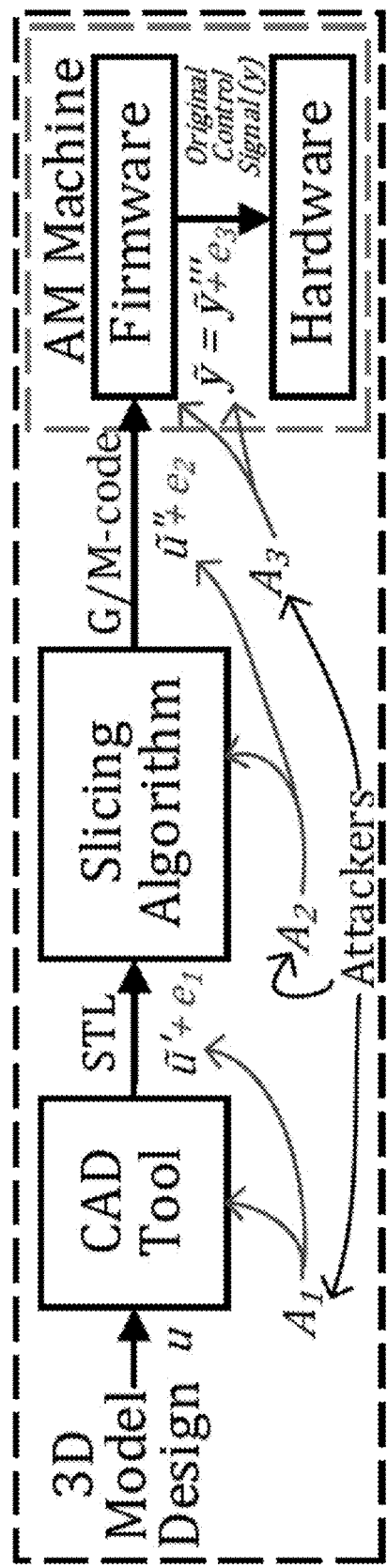
FIG. 1 shows possible adversary attack points in an AM system.

As used herein, the term "additive manufacturing" refers to a process in which a 3D object is printed in successive layers of materials by a manufacturing machine (e.g. a 3D printer).

As used herein, the term "cyber domain" refers to the digital process chain of an AM system. The cyber domain may comprise non-manufacturing 3D modeling tools (e.g. Sketchup) to create a computer-based 3D model design and computer aided manufacturing (CAM) tools for converting the 3D model design into G/M code based.

As used herein, the term "physical domain" refers to the physical process chain of an AM system (e.g. a manufacturing machine that executes G/M code to construct a 3D model).

As used herein, the term "G-code" is defined as a computer language comprising lines of code representing a layer-by-layer description of the 3D model. The G-code also defines a plurality of design variables each providing specific information (e.g. orientation of the 3D model, nozzle velocity etc.) to guide the manufacturing machine during the printing process.

As used herein, the term "M-code" is defined as a computer language comprising lines of code representing a layer-by-layer description of the 3D model. The M-code also defines a plurality of design variables each providing specific information to guide the manufacturing machine during the printing process. G-code and M-code are two coding types that perform the same function.

As used herein, the term "analog emissions" refers to the physical signals (e.g. power, electromagnetic, thermal, and acoustic emissions) produced by the manufacturing machine during the process of printing a 3D model.

As used herein, the term "side-channel" refers to the physical source of an analog emission.

As used herein, the term "cyber physical system" refers to an integration of computation, networking and physical processes. Physical components and software components are interconnected in multiple ways depending on the context of the system.

As used herein, the term "kinetic cyber attack" refers to the acquisition of analog emissions emanating from the manufacturing machine during printing of the 3D model. After acquisition, an attacker extracts the G/M code from the analog emissions in order to reproduce the 3D model.

As used herein, the term "entropy" is defined as the quantified value of randomness for a set of bits.

As used herein, the term "Principal Component Analysis" refers to the statistical procedure used to convert data describing a set of possibly correlated variables into a set of linearly uncorrelated variables.

Referring now to FIGS. 1-8B, the present invention features a method for detecting an attack of a cyber-physical additive manufacturing ("AM") system. The AM system may comprise both a cyber-domain and a physical domain. In some embodiments, the cyber-domain may comprise a G-code, and the physical domain may comprise a manufacturing machine. In some embodiments, an attack on the AM system comprises acquiring and processing an analog emissions signal emanating from a side channel of the manufacturing machine in order to derive the G-code. The present detection method may be applied via an algorithm integrated at any step in the AM system process chain to detect an attack. In some embodiments, the method comprises obtaining the analog emissions signal (100) from one or more side channels of the manufacturing machine. A set of extracted control signals may then be obtained from the analog emissions signal (101). A set of original control signals are parameters defined in the G-code. Each original control signal may have one or more corresponding signal flows in the physical domain via the manufacturing machine. Moreover, each corresponding signal flow may produce one or more analog emission, which contributes to the analog emissions signal. During an attack of the AM system, the analog emissions signal is measurably altered and consequently, each original control signal is altered as well. Determining if an attack is in process comprises comparing each extracted control signal to each original control signal to detect the presence of an alteration.

In further embodiments, a statistical procedure is applied (102) to the set of extracted control signals in order to reduce the amount of information comprising the set. Without wishing to limit the invention to a particular theory or mechanism, this can effectively improve processing time. In some embodiments, the statistical procedure utilized is Principal Component Analysis. An estimation function $\hat{f}_i$, may then be computed (103) for each extracted control signal i, where $\hat{f}_i$ relates extracted control signal i to a corresponding analog emission. Function $\hat{f}_i$, an estimation of $f_i$, may be generated by a supervised learning approach employing the set of extracted control signals as a data training set. Non-limiting examples of the supervised learning approach include: Gradient Boosting Regressor, Ridge Regression, Stochastic Gradient Descent Regression, Bayesian Ridge Regression, Passive Aggressive Regression, Decision Tree Regression, Elastic Net Regression, Linear Regression with Lasso or k-Nearest Neighbor Regression, used individually or in combination.

Additional embodiments feature an error threshold defined (104) for each original control signal. Further, a set of original control signals are acquired from the G-code (202), where each extracted control signal obtained from the analog emissions signal has a corresponding original signal value defined in the G-code. The set of original control signals comprises each corresponding original signal value.

Consistent with previous embodiments, the analog emissions signal is continuously acquired from a side channel of the manufacturing machine during execution of the G-code. Consequently, the value of each extracted control signal is also continuously updated. For a given update, the analog emissions signal is fed to $\hat{f}_i$ to obtain extracted control signal i, which is then compared to its corresponding original control signal. An attack is detected if the absolute value of the difference between any of the extracted control signals and their corresponding original control signal is outside of the error threshold. The error threshold can be defined for a specific control signal.

The present invention also features a detection system (300) for detecting an attack of a cyber-physical additive manufacturing ("AM") system. In some embodiments, the AM system may comprise a stereolithography ("STL") module (311) storing STL files, a slicing algorithm module (313) storing a slicing algorithm, and a manufacturing machine (301) executing a G-code to construct a 3D object. A computer aided design of the 3D object may be converted to one or more STL files before the slicing algorithm converts the computer aided design into G-code. During construction of the 3D object, the manufacturing machine (301) emanates a plurality of analog emissions comprising an analog emissions signal. The attack occurs when an attacker acquires and processes the analog emissions signal to derive the G-code and reproduce the 3D object.

In further embodiments, the detection system (300) may comprise one or more analog emissions sensors (303), operatively coupled to the manufacturing machine (301). The sensors (303) acquire the analog emissions signal emanating from the manufacturing machine (301). In other embodiments, the sensors (303) may transmit the analog emissions signal to a pre-processing and feature extraction module (305) where independent noise signals are removed from the signal.

Additional embodiments feature a detection model module (307), operatively coupled to the pre-processing and feature extraction module (305), for estimating a relationship between the analog emissions signal and a set of original control parameters. The set of original control parameters, defined in the G-code, guide the manufacturing machine (301) during construction of the 3D object. When each control parameter is executed via the manufacturing machine (301), a corresponding analog emission, of the plurality of analog emissions, emanates from the manufacturing machine (301).

In an alternate embodiment, the analog emissions signal is transmitted by the sensors (303) directly to the detection model module (307).

During an initial execution of the G-code, the analog emissions signal is acquired from the manufacturing machine (301) by the one or more analog emissions sensors (303). The detection model module (307) may then extract a value for each original control parameter from the analog emissions signal and a relationship between each value and the corresponding analog emission is estimated. This estimated relationship is referred to as an estimation function.

During subsequent acquisitions of the analog emissions signal, the analog emissions signal is fed to the estimation function to obtain a set of extracted control parameter values. The detection model module (307) may be further configured to compare each control parameter in the set of original control parameters, to the corresponding extracted control parameter. If an absolute value of a difference between the extracted control parameter and the original control parameter is outside of a pre-determined error threshold defined for a specific extracted control parameter, then the attack is detected.

In another embodiment, the detection system (300) may further comprise an interpreter (317), operatively coupled between the G-code module (315) and the detection model module (307). The interpreter is configured to convert the G-code to canonical machining commands to be read and executed by the manufacturing machine (301). In still other embodiments, a supplementary slicing algorithm module (319) may be operatively coupled to the STL module (311) and a supplementary G-code module (309). The supplementary slicing algorithm module (319) may execute a slicing algorithm for converting STL files (311) into the G-code. The slicing algorithm module (313) may be bypassed for the supplementary slicing algorithm module (319) of the detection system (300) and the G-code module (315) may be bypassed for the supplementary G-code module (309) of the detection system (300). To illustrate, the detection system (300) may be placed to monitor the information flow at any stage of the AM system process chain and non-intrusively runs in parallel to the AM system while it is printing the 3D object. The modules of the detection system (300) that work in parallel depend on which point of the process chain information is fed to it. For example, to detect the attack on the integrity of the firmware of the AM system, the input to the detection system (300) can just be the G-code. The supplementary slicing algorithm module (319) of the detection system (300) is switched off and the AM system slicing algorithm module (313) is used.

KCAD Details and Applications
Adversary Model

In AM systems, information, such as the 3D design specification, flows through the digital process chain, and is finally converted to the control signals in the machine. In the adversary model, an attacker can infiltrate at various stages of the process chain (see FIG. 1) to alter the integrity of the tools, algorithms, and firmware. Moreover, they may add exogenous inputs $e_1$, $e_2$, and $e_3$ during the transfer of information from one stage to the other in the digital process chain. Consider y to be the control signals to the physical components of the AM machine, provided u is the true information. In this case, $ũ'$, $ũ''$, and $ỹ'''$ are the false information produced in the process chain due to the compromised integrity of the CAD tool, slicing algorithm, and the firmware respectively. It is observed that the attacks on the digital process chain by different attackers $A_1$, $A_2$ and $A_3$ always results in the modification of the control signals y. This phenomenon is what separates the CPS from traditional information and technology systems. In FDM based AM, the outcome of kinetic attack will result in the variation of control signal y to $ỹ$, such that it modifies the initial 3D design of the object.

In FDM based AM, the change in the information flow by an attacker will result in the change of control parameters y=[v, a, t, d] responsible for controlling the dynamics of the machine, where v=[$v_x$, $v_y$, $v_z$, $v_e$] represents the speed of the nozzle in different axes, along with the speed of extrusion, and $v_{i \in \{x, y, z, e\}} \in \Re_{\geq 0}$. Also, a=[$a_x$, $a_y$, $a_z$, $a_{xy}$, $a_{xz}$, $a_{yz}$, $a_{xyz}$] represents the axis of movement such that $a_{i \in \{x, y, z, xy, xz, yz, xyz\}} \in \{0, 1\}$, and a=1 represents presence of movement in the given axis and a=0 represents absence of movement. Additionally, $t \in \Re_{\geq 0}$ represents the temperature of the nozzle and d=$d_x$, $d_y$, $d_z$, $d_e$ represents the distance of the nozzle in different axis, along with the amount of extrusion, and $d_{i \in \{x, y, z, e\}} \in \Re$. Hence, the kinetic cyber-attack in FDM based AM will cause the information u to be altered such that the final control parameters to the physical components are altered to $ỹ$=[$ṽ$, $ã$, $t̃$, $d̃$].

The kinetic cyber-attack in FDM can be defined as change in the information flow ti in the digital process chain such that:

$$\begin{bmatrix} v \\ a \\ d \\ t \end{bmatrix} \pm \begin{bmatrix} e_v \\ e_a \\ d_d \\ e_t \end{bmatrix} = \begin{bmatrix} ṽ \\ ã \\ d̃ \\ t̃ \end{bmatrix} \quad (1)$$

and $ỹ \neq y$, when $\Sigma_{i \in \{v, a, d, t\}} e_i > 0$. Here $\{e_v, e_d, e_t\} \in \Re_{\geq 0}$, $e_a \in \{0, 1\}$.

KCAD Method

Let Y→O be a side-channel, where Y and O represent random variables denoting control information parameters and observed analog emission respectively. Then, the KCAD method leverages the fact that these variables have high mutual information.

Mutual Information

Let the observed analog emissions be o(t), then the control parameters, y=[v, a, t, d], responsible for controlling the dynamics of the system, emit analog emissions such that the mutual information $\{I(V;O), I(A,O), I(T;O), I(D,O)\} > 0$, where (V, A, T, D) are random variables.

The random variables O, V, T, and D are continuous and A is discrete. Let $f(o)$, $f(v)$, $f(t)$, and $f(d)$ be a probability density function (pdf) of continuous random variables O, V, T, and D respectively. And for all k, j $\in \{o, v, t, d\}$, let $f_{k \neq j}(k, j) = f_{k \neq j}(j, k)$ be the joint pdf. The conditional pdf for these random variables is then defined as $$f_{k \neq j}\langle k | j \rangle = \frac{f_{k \neq j}(k, j)}{f(j)}.$$

Then, the differential entropy of these random variables can be calculated as follows:

$$h_{K \in \{O,V,T,D\}}(K) = -\int f(k) \log(f(k)) dk \quad (2)$$

Similarly, the conditional differential entropy of these random variables can be given as follows:

$$h_{J \in \{O,V,T,D\}}\langle K|J \rangle_{K=J} = -\iint f(k,j) \log(f\langle k|j \rangle) dkdj \quad (3)$$

The mutual information between the observed analog emission and the control parameters can be given as follows:

$$I_{K \in \{V,T,D\}}(K;O) = h(K) - h\langle K|O\rangle \quad (4)$$

Let $f(a)$ be a probability distribution function of the discrete random variable A. Then the entropy of A can be calculated as follows:

$$H(A) = -\Sigma f(a)\log(f(a)) \quad (5)$$

For calculating the mutual information between O and A, the values of O can be divided into bins of length $\varepsilon$. Let $H(O_\varepsilon)$ be the entropy of O after discretization, then $h(O) = \lim_{\varepsilon \to 0}[H(O_\varepsilon) + \log(\varepsilon)]$. And the mutual information can be calculated as:

$$I(A;O) = H(A) - H\langle A|O_\varepsilon\rangle \quad (6)$$

The calculation of mutual information between two continuous random variables requires estimation of the probability density functions, which are then used in Equations 2 and 3. Kernel probability density estimation can be used for estimating the pdf based on the experimental data as:

$$\tilde{f}(x) = \frac{1}{nh}\sum_{i=1}^{n} K\frac{x-x_i}{h} \quad (7)$$

where K is a real-valued integrable kernel function and h the bandwidth. There are various kernel function that can be used for the estimation.

The proposed KCAD method can be defined as a pipeline of deterministic algorithms which takes continuous observable analog emissions o(t) as input along with the information flow U in the form of G-codes $G_t = [g_1, g_2, g_3, \ldots, g_t]$ from which the control parameters v, a, d, and t are parsed. The information U acquired by KCAD is assumed to be from a secure channel and free from any modification. KCAD method infers the analog emission O based on the given control parameters. Given the presence of a kinetic cyber-attack, the control parameters are changed to $\tilde{y} = [\tilde{v}, \tilde{a}, \tilde{t}, \tilde{d}]$ with observed analog emissions being $\tilde{O}$, such that $|\tilde{O} - O| = e$. And for $e > e^T$, where $e^T$ is the emission variation threshold, the output of the detection system is True, denoting the presence of an attack.

Attack Detectability:

Given the input O and G with parsed variables v, a, d, and t, a kinetic attack to the system, such that $\Sigma_{i \in \{v, a, d, t\}} e_i > 0$, is detected by KCAD method if its output is true.

KCAD Architecture

Figure 2:
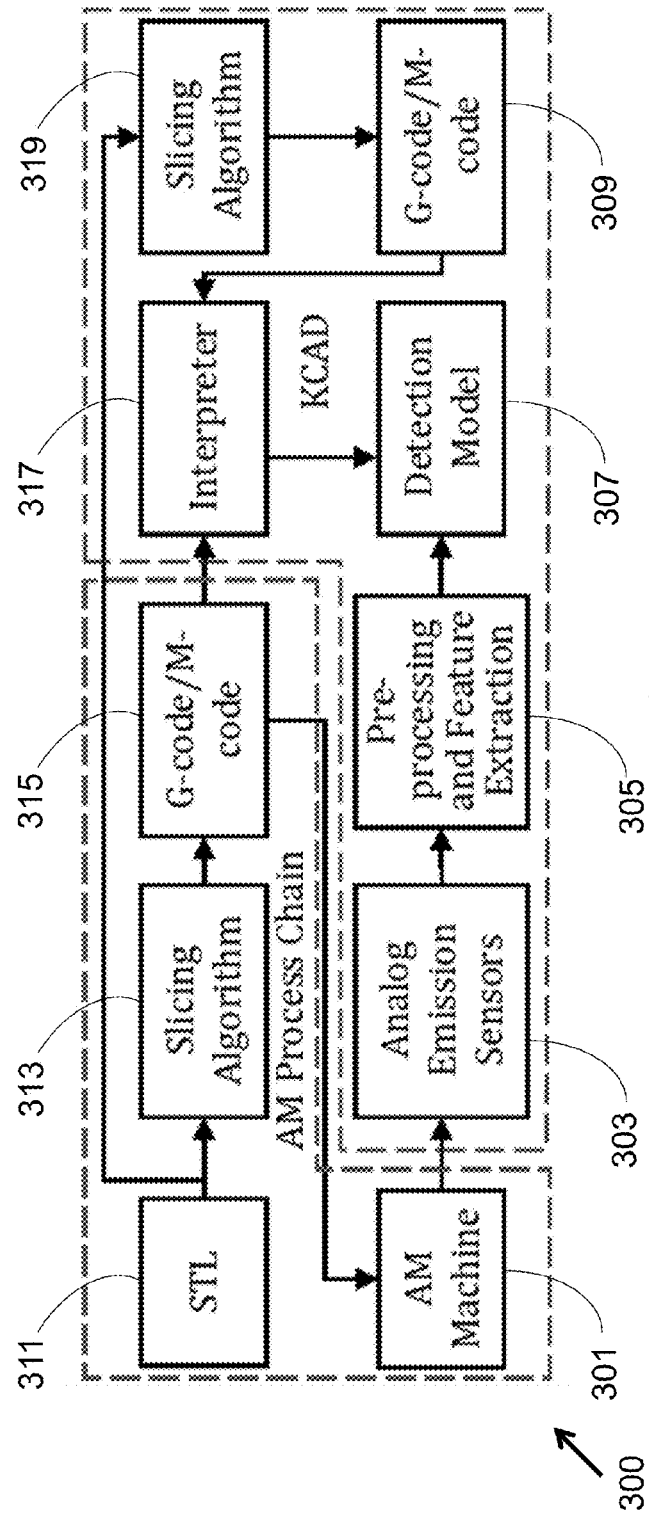
FIG. 2 shows a non-limiting schematic of the KCAD method of the present invention.
Figure 3:
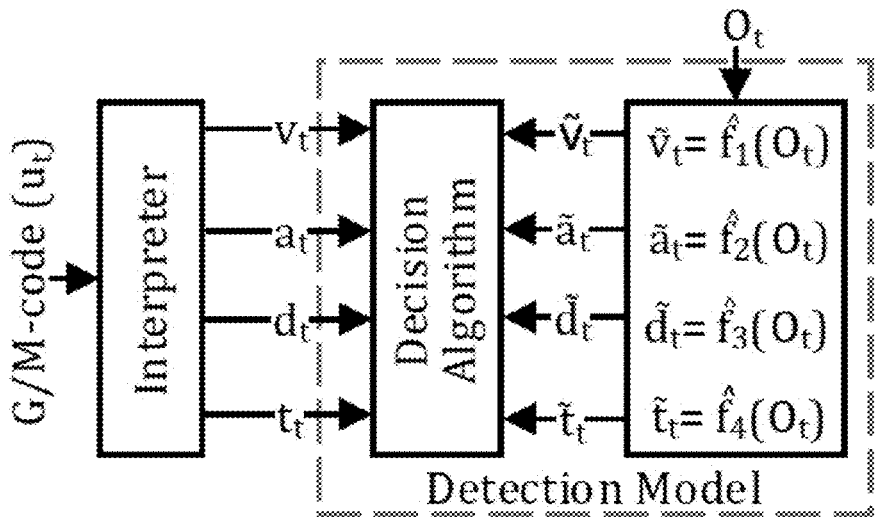
FIG. 3 shows an exemplary embodiment of the detection model.

A non-limiting example of the architecture of the simplified KCAD method is shown in FIG. 2. One of the advantages of this method is that it can be placed to monitor the information flow in any of the stages of the digital process chain. With this, the attack on the integrity of any tools, firmware, and algorithms can be detected if it has corresponding effect on the dynamics of the system. KCAD runs in parallel to the AM while it is printing, and non-intrusively and continuously acquires the observable analog emissions. The components of KCAD that work in parallel to the AM depend on which point of the process chain information is fed to it. For example, to detect the attack on the integrity of the firmware of the AM, the input to the KCAD can just be the G-code/M-code. The slicing algorithm in it can thus be switched off. However, the channel through which the information passes to the KCAD method from a different point of the digital process chain is assumed to be secure. This means that the KCAD method will always receive original/unmodified cyber data from the digital process chain.

Analog Emission Sensors:

Various sensors (piezoelectric, current, electromagnetic, etc.) can be used to monitor the analog emissions from the AM system. Given the integrity attack that introduces values $e_v$, $e_a$, $e_d$, and $e_t$ in the control parameters (v, a, d, t), the sampling frequency ($F_s$) and bandwidth (B) should be such that it can measure corresponding changes $e_v$, $e_a$, $e_d$, and $e_t$ in the analog emissions o(t). Moreover, distance and angle of placement of the sensors also affect the Signal to Noise Ratio (SNR) given as:

$$SNR_{dB} = 10\log_{10}\left(\frac{P_{Signal}}{P_{Noise}}\right) \quad (8)$$

Hence, the choice and placement of the sensors depends on the choice of side-channel and the relation between the analog emissions and the control parameters. For choice of side-channel and the corresponding analog emissions, Equations 4 and 6 can be used as a measure of relation between the observable analog emissions and the control parameters. Based on this measurement, the observed values can either be incorporated or discarded from group of features to be used for estimating the behavior of the system in KCAD.

Pre-Processing and Feature Extraction:

Pre-processing is done to improve the SNR by removing the known noise signals from the analog emissions that are independent of the control parameters. If the observable analog emission, o(t), is not equal to f(y(t)), where y represents the control parameters, then the observed analog emission can be considered as noise. The signals acquired by sensors can be too large for the estimation algorithms used in the detection model. Hence, it is necessary to extract only the informative values from the signal to improve the processing time of the detection model. For each observed signal various values (features) are derived using the original signal.

$$O_t = \begin{bmatrix} o_1^{f1} & o_1^{f2} & o_1^{f3} & \ldots & o_1^{fn} \\ o_2^{f1} & o_2^{f2} & o_2^{f3} & \ldots & o_2^{fn} \\ \vdots & \vdots & \vdots & \ddots & \vdots \\ o_t^{f1} & o_t^{f2} & o_t^{f3} & \ldots & o_t^{fn} \end{bmatrix} \quad (9)$$

Each column represents the number of features and the row represents the discretized values of the signal o(t). The type of features extracted is specific to the observed analog emissions. For reducing the dimension of the extracted features, principle component analysis is used.

Interpreter:

Each block (line) of instruction (G/M-code) sent to the AM consists of control parameters. These instructions or numerical control codes are converted to the canonical machining commands using interpreters such as NIST RS274NGC. In the KCAD method, a lighter version of arduino G-code and NIST RS274NGC Interpreter was used to extract the control signals v, a, d, and t. These signals are then sent to the detection model.

Detection Model: The detection model uses the supervised learning approach to estimate the function $\hat{f}_i(O_t, \alpha_n)$ with i=1, 2, 3, 4 using the training data-set of observed analog emissions. For each control parameters, the function with respective parameter α is estimated. Various predictive models can be estimated based on the initial training data-sets. The training data-sets will require to balance the trade-off between bias and variance to find optimal parameter α. K-fold cross-validation is used to perform data driven validation for the estimated function $\hat{f}_n(\cdot)$. For the regression function estimation, learning algorithms such as Gradient Boosting Regressor (GBR), Ridge Regression, Stochastic Gradient Descent Regression (SGDR), Bayesian Ridge Regression (BRidge), Passive Aggressive Regression (PAR), Decision Tree Regression (DTR), Elastic Net Regression (ENet), Linear Regression with Lasso, and k-Nearest Neighbor Regression (kNN) is used. Each of these models is compared using metrics such as explained variance, Mean Absolute Error (MAE), Mean squared error (MSE), Median Absolute Error, and $R^2$ Score. For a function that needs to be estimated for classification, classifiers such as Support Vector Machine (SVC) with Linear and Radial Basis Function (RBF) as kernels, Logistic Regression, Stochastic Gradient Descent Classifiers, Ensemble of AdaBoost and Gradient Boosting are used. They are compared using Receiver Operating Characteristic (ROC) curves, and the model with the least error is selected.

Detection Algorithm:

The detection algorithm compares the real control parameters given by the interpreter and the values calculated by the estimated functions $\hat{f}_n(\cdot)$.

---

Algorithm 1: Detection Algorithm.

Input: Real and Estimated Control Parameters
[v, a, d, t], [$\tilde{v}$, $\tilde{a}$, $\tilde{d}$, $\tilde{t}$]
Output: Attack Flag $F_A$
1  Define Error Thresholds $e_v^T$, $e_a^T$, $e_d^T$, $e_t^T$
2  Initialize $f_v = 0$, $f_a = 0$, $f_d = 0$, $f_t = 0$
3  for each i ∈ v, a, d, t do
4      | if |i − ĩ| > $e_i^T$ then
5      |     | $f_i = 1$
6  if $\Sigma_{i \in \{v,a,d,t\}} f_i \geq 1$ then
7      | $F_A = 1$
8  return $F_A$

---

In Algorithm 1, line 1, the error variation thresholds are defined. This value is based on the accuracy of the estimated functions $\hat{f}_n(\cdot)$ during the training phase of the detection model. Lines 3 to 5 determines if the estimated control parameters and the real control parameters vary more than the error threshold. Lines 6-7 set the attack detection flag to high if any of the control parameters varies more than the error variation threshold. Finally, in line 8 the attack flag is returned.

Offline vs. Online Model Estimation:

The model function $\hat{f}_n(\cdot)$ estimation can be done either online or offline. This is necessary to consider because of the fact that AM machine will have varying observable analog emission over long period of time due to wear and tear of the mechanical structures. Offline function estimation can have shorter response time. However, online estimation can be done for higher accuracy with longer response time.

Acoustic Analog Emissions

Acoustic analog emissions are one example of the observable emissions in cyber-physical additive manufacturing system. The fundamental working principle behind KCAD method is that the analog emissions o(t) must have high mutual information with the control parameters y(t). As a proof of concept of the KCAD method, acoustics will be used as the observable analog emissions to detect the presence of kinetic cyber-attack on AM. However, it is trivial to infer that the observed analog emission will have weak relation with the control parameter temperature, t. Therefore, only a kinetic cyber-attack affecting the control parameters v, a, and d will be considered. The main source of acoustics in FDM based 3D Printers are the vibration of the stepper motors. These 3D Printers comprise at least one stepper motor to control the movement of the nozzle of the printer in each axis (x, y, and z axis). These stepper motor comprises a rotor (permanent magnet) and a stator (electromagnet). The varying radial electromagnetic force acting on the stator of the stepper motor produces vibration. This vibration is the source of acoustics. The radial electromagnetic force is controlled by the control parameters, such as speed of the movement of the motor. However, the natural frequency of the stator is determined by the load, connected frame, and the structure of the stator. Hence, resonance occurs when the vibration produced by the radial electromagnetic matches the harmonics of the natural frequency of the stator. This resonance frequency is different for different stepper motors responsible for moving the 3D Printer's nozzle in x, y, and z. This allows an estimation of functions to separate the movement in different axes. The analog emission sensors for capturing the acoustic emissions will require sampling frequency of more than 40 kHz to capture the range of audible sound 20 Hz to 20 kHz. During the pre-processing stage, a digital filter is used to remove, low and high frequency noise.

Dynamic time warping is used to dynamically assign the window size w for feature extraction. However, an initial fixed length window size (10-50 ms) will be used to extract features size as Zero Crossing Rate, Energy Entropy, Spectral Entropy, and Mel Frequency Cepstral Coefficients (MFCCs). Using these features, Euclidean distance is measured to define the dynamic window size for accurate feature extraction.

As shown in Algorithm 2, line 4 measures the Euclidean distance between the features of the previous analog observation with the current analog emission in the discrete time series (based on the sampling frequency) and determines if this distance is greater than the threshold distance $d^T$, which is estimated by measuring the distance between the analog emission of training data-sets. As windowing is done to extract the features from the observed analog emissions o(t), the control parameter v can be determined from d and vice-versa, where v=d/w and w is length of the window in seconds.

---

Algorithm 2: Dynamic Window Size Determination.

Input: Observed Analog Emission o(t)
Output: Dynamic Windows w = [$w_1, w_2, \ldots, w_n$]
1  Initialize n = 1, $i_{previous} = 1$
2  Extract Features $O_t$                    // n →Number of Features
3  for i = 2 to t do
4      | if $|\sqrt{(o_i^1 - o_{i-1}^1)^2 + \ldots + (o_i^n - o_{i-1}^n)^2}| > d^T$ then
       |                                      // $d^T$ →Threshold Distance
5      |     | $w_n = i - i_{previous} + 1$
6      |     | $i_{previous} = i + 1$
7      |     | n = n + 1
8  return w

---

For FDM based AM, the KCAD method can monitor any kinetic attacks modifying the control parameters v, a, and d by analyzing the variation in the acoustic analog emissions to the corresponding control parameters v and a.

Performance Metrics

The performance of an attack detection method can be measured with two metrics True Positive Rate (TPR) and True Negative Rate (TNR).

$$TPR = \frac{TP}{TP+FN} \quad (10)$$

True Positive (TP) is the total number of positive detection when there is an attack in the system, and False Negative (FN) is the total number of negative detections during the presence of an attack. Similarly, $$TNR = \frac{TN}{TN+FP}, \quad (11)$$

where True Negative (TN) is the total number of positive detection when there isn't any attack to the system, and False Positive (FP) is the total number of positive detection when there isn't any attack to the system. Then, the accuracy of the system can be measured as follows:

$$Accuracy = \frac{TP+TN}{TotalSample}. \quad (12)$$

Due to non-intrusive nature of KCAD system, it can be implemented in the legacy systems as well as state-of-the-art AM systems. To illustrate this concept, an FDM based 3D printer is chosen for evaluating the performance of the KCAD system.

Experimental Results

Experimental Setup

Figure 4:
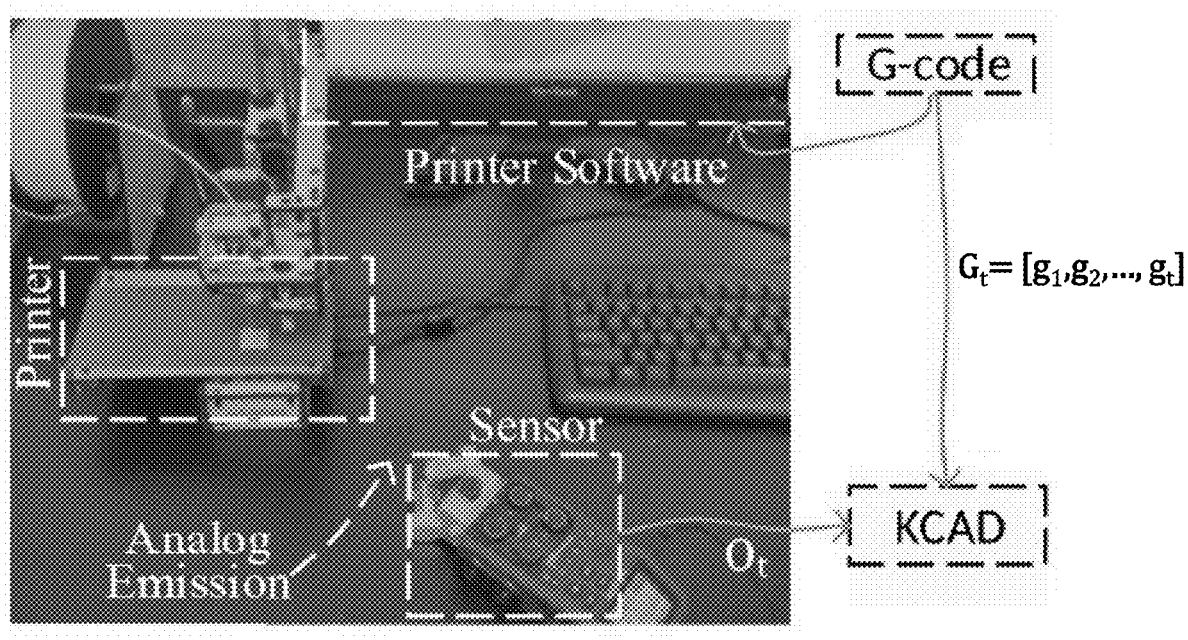
FIG. 4 shows the KCAD method experimental setup.

The experimental setup for the KCAD method evaluation is shown in FIG. 4. This evaluation tests KCAD performance against integrity attacks on the printer's firmware. In a simple scenario, a modified firmware is installed in the 3D Printer by an attacker. This attack modifies the control signal to the 3D Printer, which introduces variation in the geometry of the 3D object. The audio recorder is placed at an optimal distance to acquire the acoustics. In the experiment, the recorder is placed at 45° angle to the x and y axis to acquire the variation of the signal in both direction with a single recorder. During the training phase, G-codes are written to move the nozzle of the printer in various x and y axis directions with various printing speeds (400 mm/min to 4500 mm/min with 100 mm/min step size). These speed ranges are machine specific. Using this training data, the model function was estimated for the control parameters $v_x$, $v_y$, and $a=[a_x, a_y, a_z, a_{xy}]$. Using a similar approach, model functions for parameters $v_e$, $v_z$, different directions, and $a=[a_{yz}, a_{xz}, a_{xyz}]$ can be estimated.

Mutual Information Calculation

To demonstrate the dependency of the acoustic analog emissions with the control parameters $v=[v_x, v_y, v_z]$ and $a=[a_x, a_y, a_z a_{xy}]$, the mutual information between each parameter and the acoustic analog emissions is calculated. Each control parameter in a, is treated as a discrete random variable having a different label that depends on the combination of axis movements. Table 1 shows the mutual information calculated for the control parameters and the features extracted from the observed analog emissions. It can be seen that different features have varying mutual information with the control parameters. Also, it can be observed that the mutual information between the speed in z-axis and the analog emission is comparatively low. This is due to the reason that speed in z-axis is almost constant in most of the 3D Printers. The estimation function utilizes different features on the basis of the mutual information and principle component analysis to select the features that are most relevant.

TABLE 1

Mutual Information in Bits Between Features and Control Parameters

| Parameters | $o_f^1$ | $o_f^2$ | $o_f^3$ | $o_f^4$ | $o_f^5$ | $o_f^6$ | $o_f^7$ | $o_f^8$ | $o_f^9$ | $o_f^{10}$ | $o_f^{11}$ | $o_f^{12}$ | $o_f^{13}$ | $o_f^{14}$ |
|---|---|---|---|---|---|---|---|---|---|---|---|---|---|---|
| $v_x$ | 0.79 | 0.95 | 0.16 | 0.81 | 0.74 | 0.76 | 0.35 | 1.18 | 1.51 | 0.31 | 0.55 | 0.69 | 0.75 | 0.71 |
| $v_y$ | 0.27 | 0.67 | 0.11 | 0.43 | 0.41 | 0.24 | 0.23 | 1.31 | 1.10 | 0.23 | 0.44 | 0.45 | 0.55 | 0.60 |
| $v_z$ | 0.16 | 0.07 | 0.0806 | 0.08 | 0.07 | 0.08 | 0.07 | 0.07 | 0.07 | 0.07 | 0.07 | 0.07 | 0.08 | 0.09 |
| a | 0.58 | 0.82 | 0.18 | 0.69 | 0.69 | 0.53 | 0.44 | 1.91 | 1.17 | 0.64 | 0.74 | 0.22 | 0.40 | 0.39 |

Model Function Estimation

The function, $\hat{f}_i(O_t, \alpha_n)$, estimation is the fundamental step in the KCAD method. The parameter $[\alpha_1, \alpha_2, \ldots, \alpha_n]$ are responsible for minimizing the cost functions used by the learning algorithms. This estimation is done in the training phase. Based on the relation between the control parameters and the features extracted from observed analog emissions, the estimated functions can be used for regression or classification. The relation between the control parameter v and observed analog emissions o(t), both being continuous random variables, can be estimated using regression algorithms, where the parameter a is a discrete random variable and classifiers are used for estimating the function $\hat{f}(\bullet)$. Various algorithms were used, and a comparison was performed between them to select the function $\hat{f}(\bullet)$ that gives the least error.

Regression:

Function $\hat{f}_{[v_x, v_y]}(O_t, \alpha_n)$ is estimated for the control parameter v based on $O_t$. From Table 2, it is clear that Gradient Boosting Regression outperforms the rest of the regression models in terms of the error metrics. Hence, it is selected to estimate the function for the control parameters $(v_x, v_y)$. Function for $v_z$ is not estimated as speed in z-axis is constant.

Figure 5:
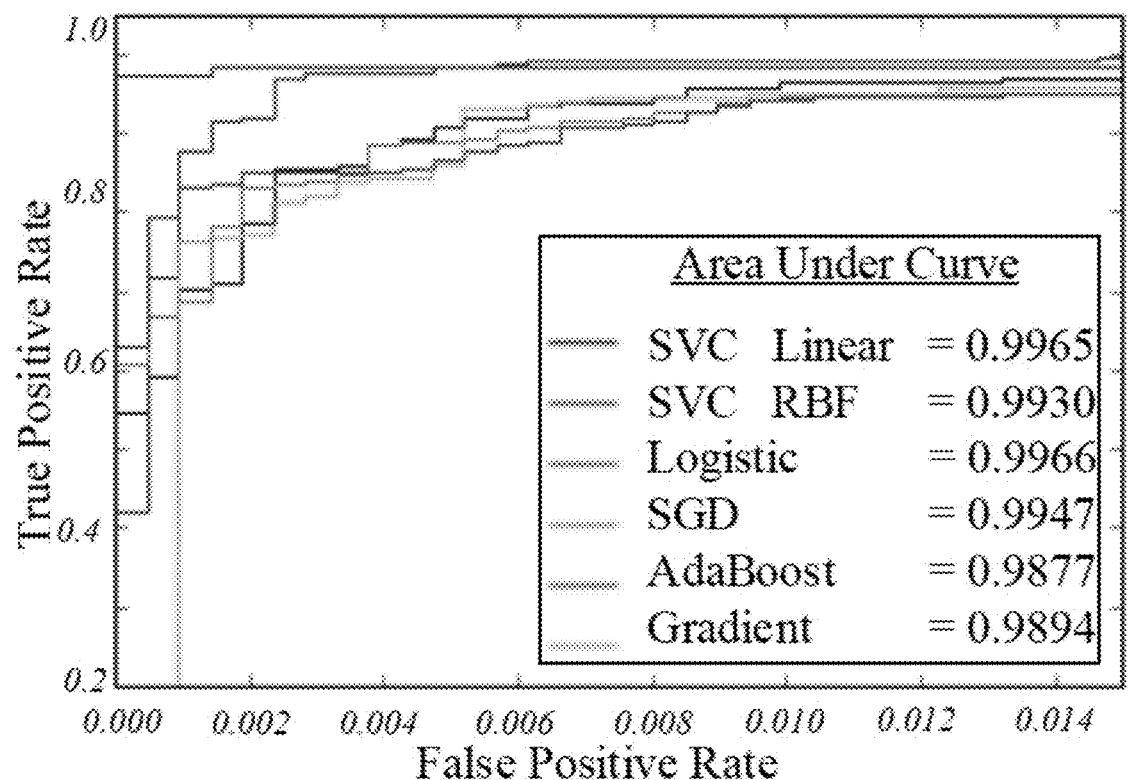
FIG. 5 shows the radius of curvature ("ROC") of classifiers.
Figure 6:
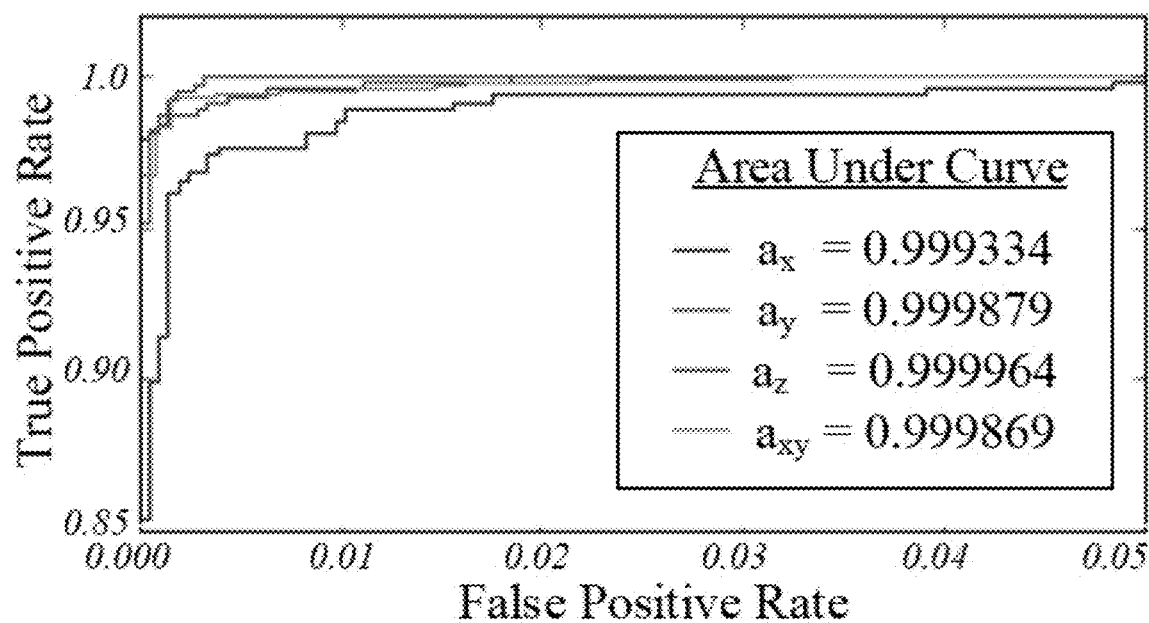
FIG. 6 shows the ROC of multi-classes, over versus the rest.

Classification:

For the parameter a, various functions estimated along with their performance is compared in FIG. 5. The estimation function is treated as one versus the rest classification and the radius of curvature ("ROC") is calculated as an average of ROC of all the classes i.e., various movement axis, $[a_x, a_y, a_z, a_{xy}]$. From FIG. 5, logistic regression classifier is selected as the optimal function for the classification. In FIG. 6, the ROC curve of various classes calculated as a one versus rest classification using Logistic Regression classifier is presented. Since, the area under the curve for the z-axis movement class is higher, the detection of presence of nozzle movement in z-axis is easiest compared to the other classes. With these functions estimated for various control parameters, KCAD can effectively detect the variation in the analog emissions with the expected emissions in the presence of kinetic cyber-attacks on the firmware of the 3D Printer.

TABLE 2

Regression Models Comparison for $\hat{f}_v(.)$

| Model | MSE | Variance | MAE | Median AE | $R^2$ |
|---|---|---|---|---|---|
| GBR | 0.0076 | 0.9923 | 0.0037 | 0.0167 | 0.9923 |
| Ridge | 0.0147 | 0.9854 | 0.0090 | 0.0775 | 0.9851 |
| SGDR | 0.0148 | 0.9852 | 0.0090 | 0.0785 | 0.9850 |
| BRidge | 0.0149 | 0.9852 | 0.0089 | 0.0772 | 0.9849 |
| PAR | 0.0183 | 0.9817 | 0.0095 | 0.0899 | 0.9815 |
| DTR | 0.0258 | 0.9741 | 0.0090 | 0.0582 | 0.9740 |
| ENet | 0.0786 | 0.9212 | 0.0210 | 0.1990 | 0.9208 |
| Lasso | 0.1015 | 0.8980 | 0.0241 | 0.2331 | 0.8976 |
| kNN | 0.0025 | 0.4997 | 0.0014 | 0.0182 | 0.4997 |

Results for Detection of Kinetic Attack

A zero-day kinetic attack on the 3D Printer's firmware was developed to test the KCAD method. The attack modifies the nozzle speed in the x and y direction while printing, thus effectively changing the dimension of the object. Additionally, the axis values are changed resulting in the deformation of the object. For detecting the variation of speed on x-axis and y-axis, the speed is varied from 600 mm/min to 3500 mm/min, while the attack is assumed to introduce range of variation in the original speed i.e. from 50 mm/min to 1000 mm/min. From the function estimation, error threshold for speed $e_v^T$ is set as 200 mm/min.

Tables 3 and 4 show that for higher speed and lower speed variation (δv), the true positives are lower compared to the low speed and high speed variation. However, the false positives are higher for higher speeds. Intuitively, this is due to the fact that feature extracted prominently comprises MFCC, which focuses on extracting more features from lower frequency range rather than higher frequencies causing poor function estimation for higher speeds. KCAD accuracy for detection of attack on control parameter v can be calculated using Equation 12 as 72.83%. For testing the performance of KCAD method for detecting the change in the control parameter d introduced by the modified firmware, distance is varied from 3 mm to 20 mm. The error threshold for the distance is selected as 3 mm based on the error in the estimated function.

TABLE 3

True Positives for Speed Variation

| δv | TP for Speed (*100 mm/min) | | | | | | | | | Total |
|---|---|---|---|---|---|---|---|---|---|---|
| mm/min | 7 | 9 | 12 | 15 | 17 | 20 | 25 | 30 | 35 | TP |
| 1000 | 16 | 16 | 16 | 16 | 16 | 16 | 16 | 16 | 16 | 144 |
| 500 | 16 | 16 | 16 | 16 | 16 | 14 | 15 | 16 | 14 | 139 |
| 300 | 16 | 16 | 16 | 13 | 10 | 7 | 7 | 8 | 7 | 92 |
| 200 | 13 | 16 | 10 | 9 | 8 | 6 | 8 | 8 | 6 | 84 |
| | TPR | | | | | | | | | 0.7968 |

TABLE 4

False Positives for Speed Variation

| δv | FP for Speed (*100 mm/min) | | | | | | | | | Total |
|---|---|---|---|---|---|---|---|---|---|---|
| mm/min | 7 | 9 | 12 | 15 | 17 | 20 | 25 | 30 | 35 | FP |
| 1000 | 5 | 4 | 3 | 6 | 5 | 7 | 7 | 6 | 8 | 51 |
| 500 | 4 | 3 | 2 | 5 | 5 | 8 | 6 | 8 | 8 | 54 |
| 300 | 2 | 2 | 3 | 5 | 5 | 7 | 6 | 6 | 7 | 47 |
| 200 | 3 | 1 | 3 | 5 | 2 | 8 | 7 | 8 | 7 | 44 |
| | FPR | | | | | | | | | 0.3402 |

Table 5 shows that the number of true positive is decreasing with the increasing speed and lower distance variation δd. Moreover, the number of false positive is increasing with the increasing speed. Using Equation 12, the accuracy for detection of attack on control parameter d is calculated to be 79.25%.

TABLE 5

True Positives for Distance Variation

| δd | TP for Speed (*100 mm/min) | | | | | | | | | Total |
|---|---|---|---|---|---|---|---|---|---|---|
| mm | 7 | 9 | 12 | 15 | 17 | 20 | 25 | 30 | 35 | TP |
| 20 | 16 | 16 | 16 | 16 | 16 | 16 | 16 | 14 | 16 | 142 |
| 10 | 16 | 15 | 16 | 16 | 16 | 15 | 14 | 13 | 14 | 135 |
| 5 | 16 | 13 | 14 | 10 | 12 | 14 | 13 | 12 | 15 | 119 |
| 3 | 14 | 10 | 12 | 10 | 11 | 10 | 12 | 11 | 13 | 103 |
| | TPR | | | | | | | | | 0.8663 |

TABLE 6

False Positives for Distance Variation

| δd | FP for Speed (*100 mm/min) | | | | | | | | | Total |
|---|---|---|---|---|---|---|---|---|---|---|
| mm | 7 | 9 | 12 | 15 | 17 | 20 | 25 | 30 | 35 | FP |
| 20 | 4 | 4 | 4 | 6 | 4 | 3 | 3 | 5 | 4 | 37 |
| 10 | 3 | 4 | 4 | 5 | 4 | 4 | 4 | 5 | 5 | 38 |
| 5 | 2 | 5 | 5 | 5 | 5 | 4 | 5 | 4 | 7 | 42 |
| 3 | 2 | 4 | 7 | 7 | 5 | 2 | 5 | 5 | 8 | 45 |
| | FPR | | | | | | | | | 0.2812 |

The movement in x, y, z, and xy axis was modified to measure the KCAD performance against firmware modification attacks that vary the control parameter a, which determine the movement axis. Table 7 shows that the true positive rate is decreasing with increase in speed and false positive rate in increasing with increase in the speed. The accuracy for detection of attack on control parameter a is 79.07%. The present KCAD method relies on the fact that any zero-day kinetic cyber-attack results in variation of control parameters v, a, and d. Hence, treating these parameters as synthetic benchmarks, the accuracy of the KCAD method, for measuring the variation of various control parameters v, a, and d is 77.45%.

TABLE 7

True Positives for Axis Variation

| Axis, | TP for Speed (*100 mm/min) | | | | | | | | Total |
|---|---|---|---|---|---|---|---|---|---|
| Total TP | 7 | 9 | 12 | 15 | 17 | 20 | 25 | 30 | 35 | TP |
| $a_x$, 32 | 32 | 32 | 28 | 28 | 24 | 21 | 21 | 20 | 19 | 225 |
| $a_y$, 32 | 31 | 32 | 27 | 25 | 23 | 19 | 19 | 19 | 18 | 213 |
| $a_{xy}$, 24 | 20 | 21 | 21 | 19 | 19 | 20 | 19 | 18 | 17 | 174 |
| $a_z$, 24 | 24 | 20 | 19 | 18 | 18 | 19 | 18 | 19 | 18 | 173 |
| | | | | TPR | | | | | | 0.7787 |

TABLE 8

False Positives for Axis Variation

| Axis, | FP for Speed (*100 mm/min) | | | | | | | | Total |
|---|---|---|---|---|---|---|---|---|---|
| Total TN | 7 | 9 | 12 | 15 | 17 | 20 | 25 | 30 | 35 | FP |
| $a_x$, 32 | 2 | 2 | 2 | 3 | 4 | 6 | 6 | 7 | 9 | 41 |
| $a_y$, 32 | 2 | 3 | 4 | 2 | 4 | 5 | 4 | 9 | 8 | 41 |
| $a_{xy}$, 24 | 4 | 4 | 6 | 6 | 7 | 5 | 6 | 7 | 8 | 53 |
| $a_z$, 24 | 5 | 6 | 7 | 8 | 7 | 8 | 7 | 8 | 8 | 64 |
| | | | | FPR | | | | | | 0.1974 |

Test Case: Base Plate of a Quad Copter

Figure 7A:
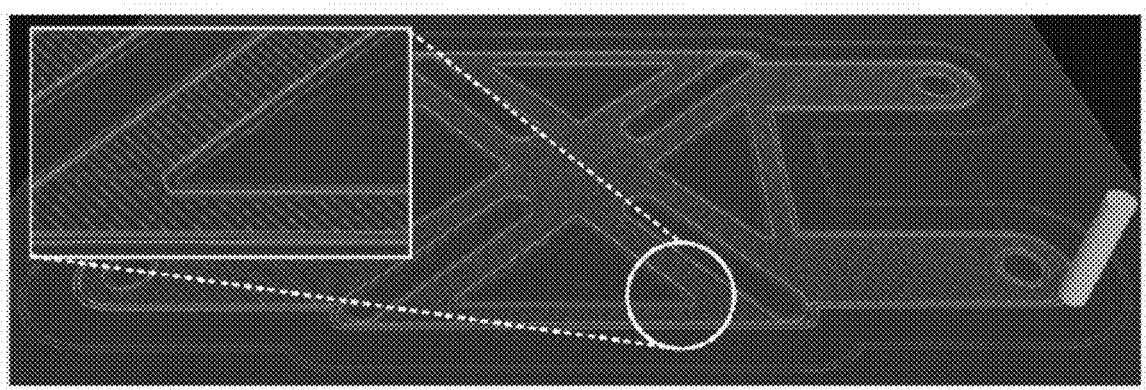
FIG. 7A shows the original G-code trace before a kinetic attack on the base plate of a quad copter.
Figure 7B:
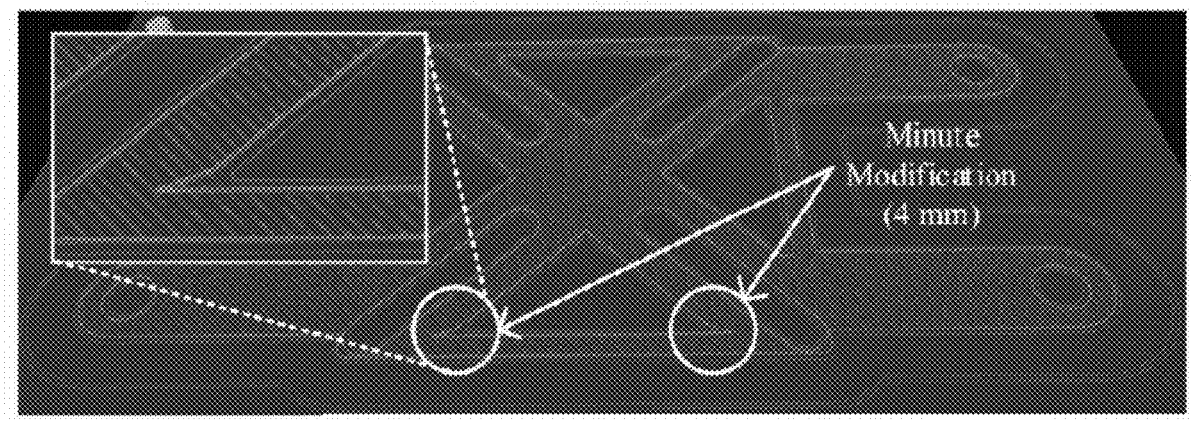
FIG. 7B shows the G-code trace of after the kinetic attack on the base plate of a quad copter.
Figure 8A:
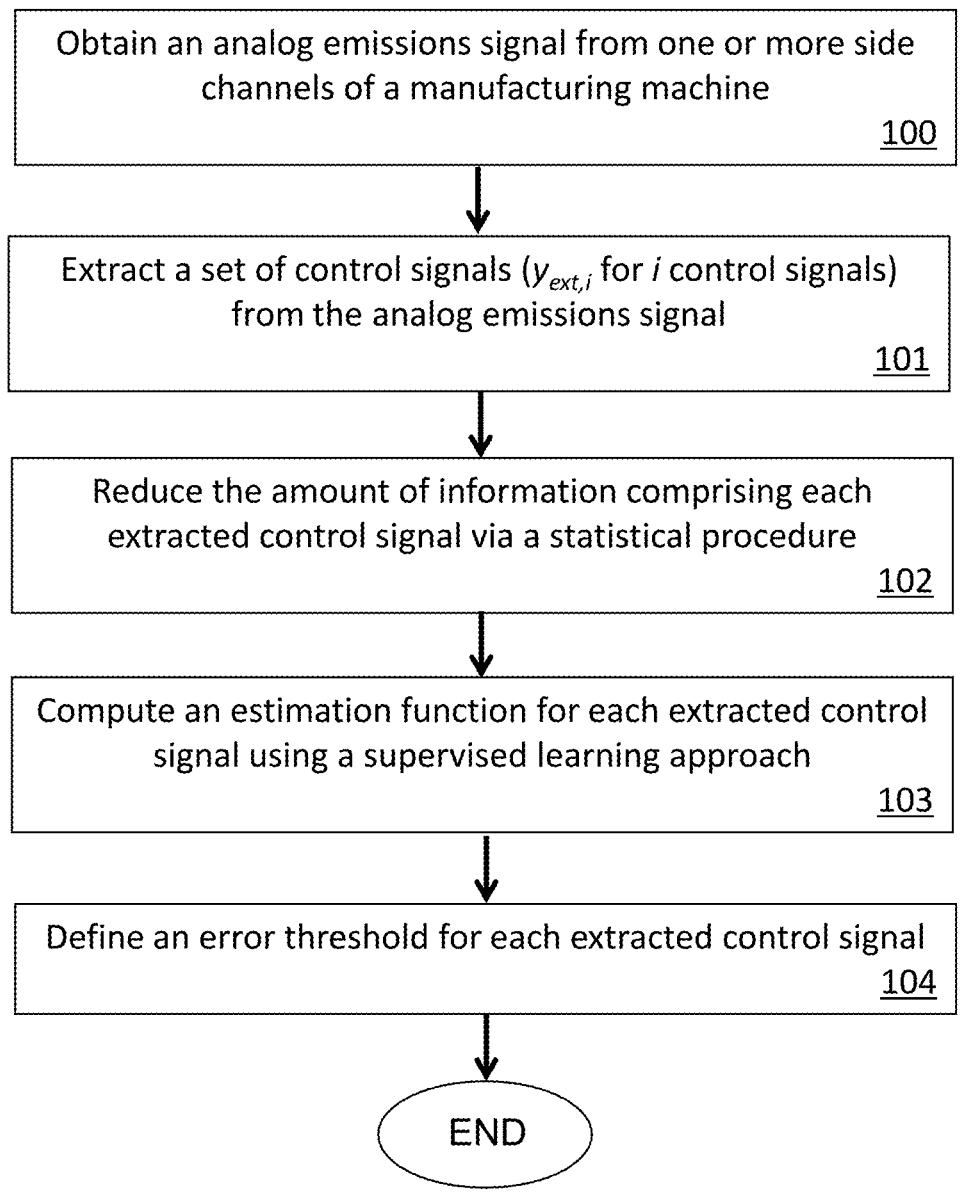
FIG. 8A shows an exemplary flow of the method for obtaining a set of estimation functions for each control signal.
Figure 8B:
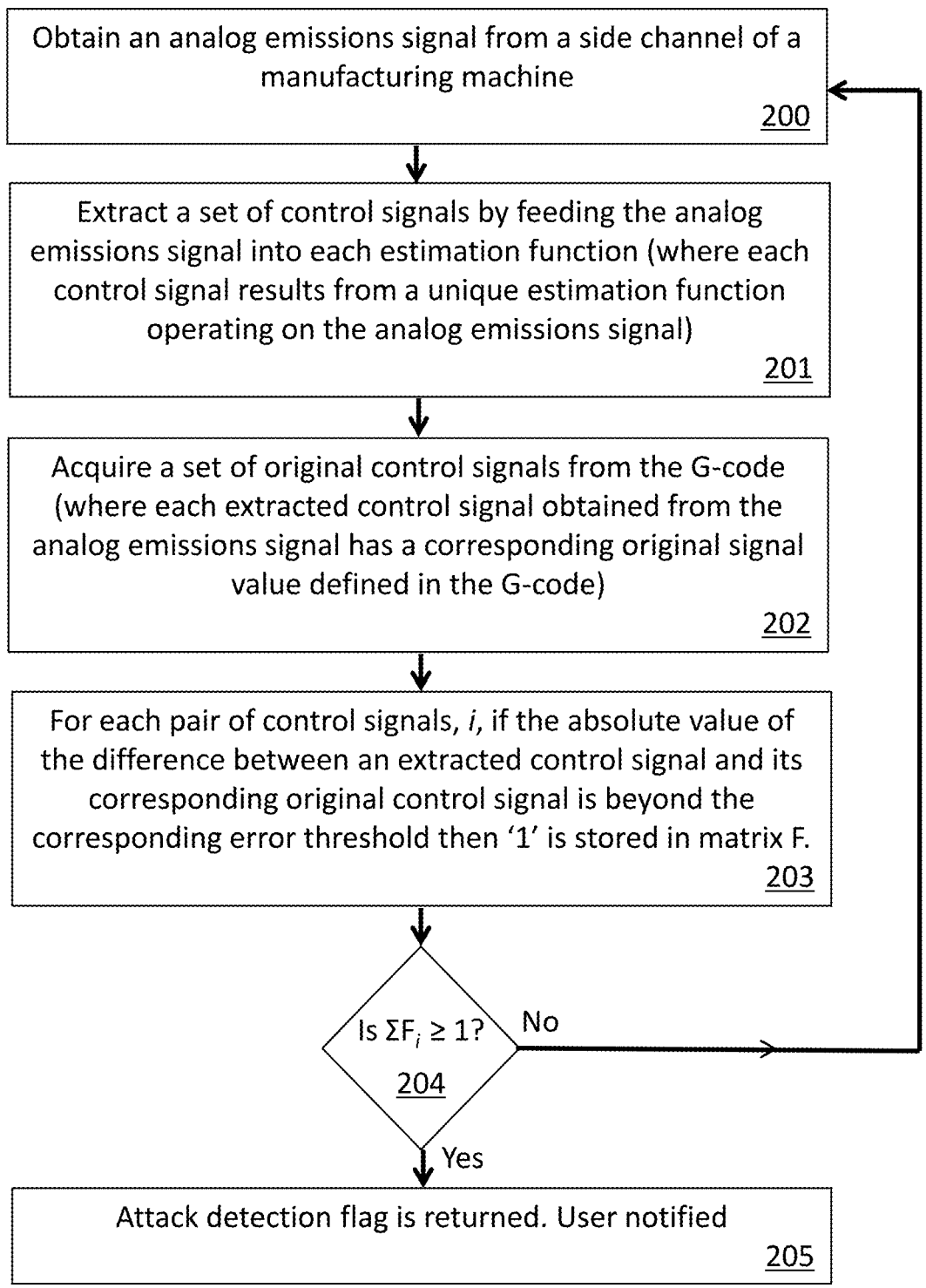
FIG. 8B shows an exemplary flow of the detection method of the present invention.
Figure 9:
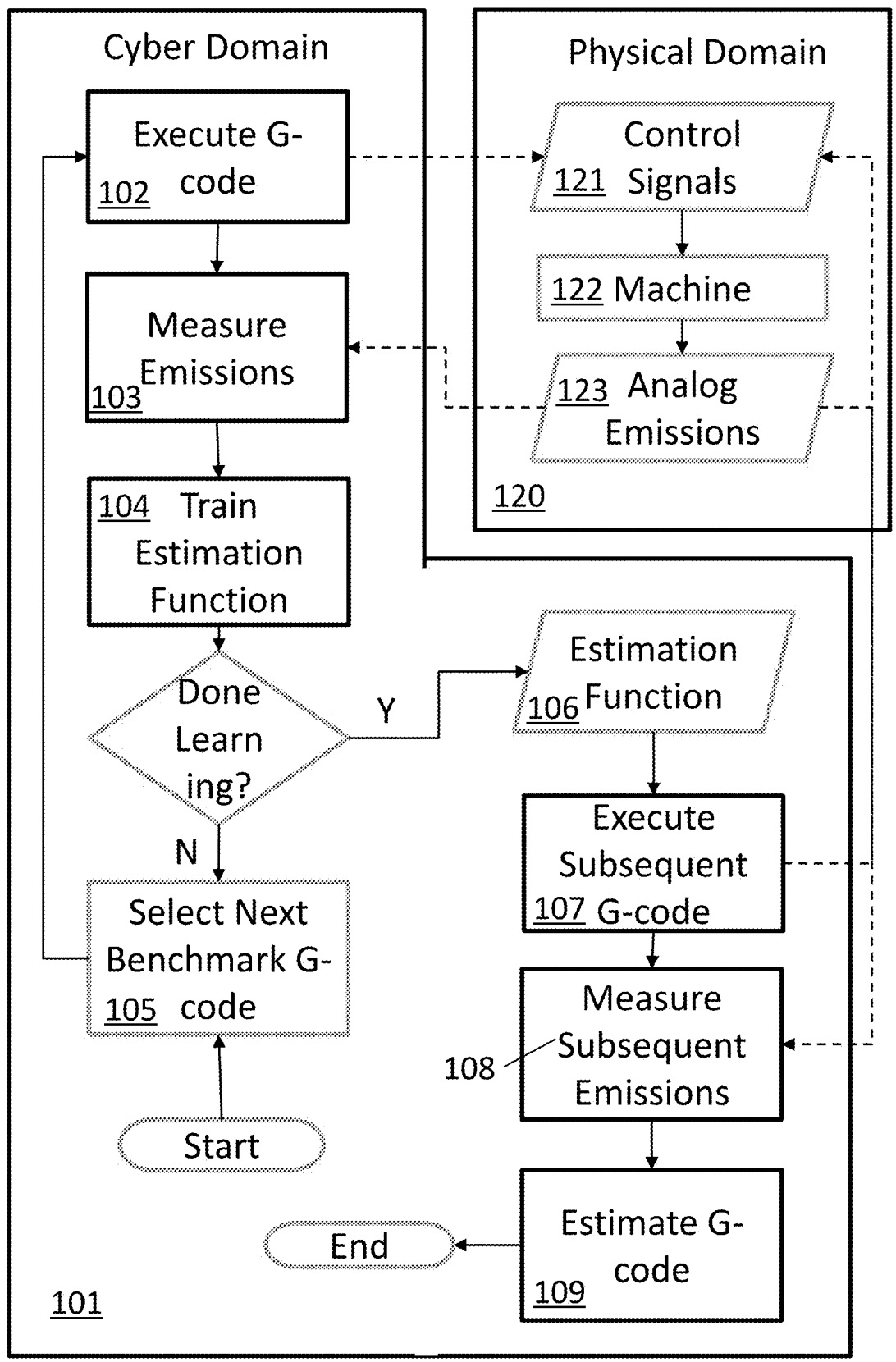
FIG. 9 shows cyber and physical components involvement of the present invention.
Figure 10:
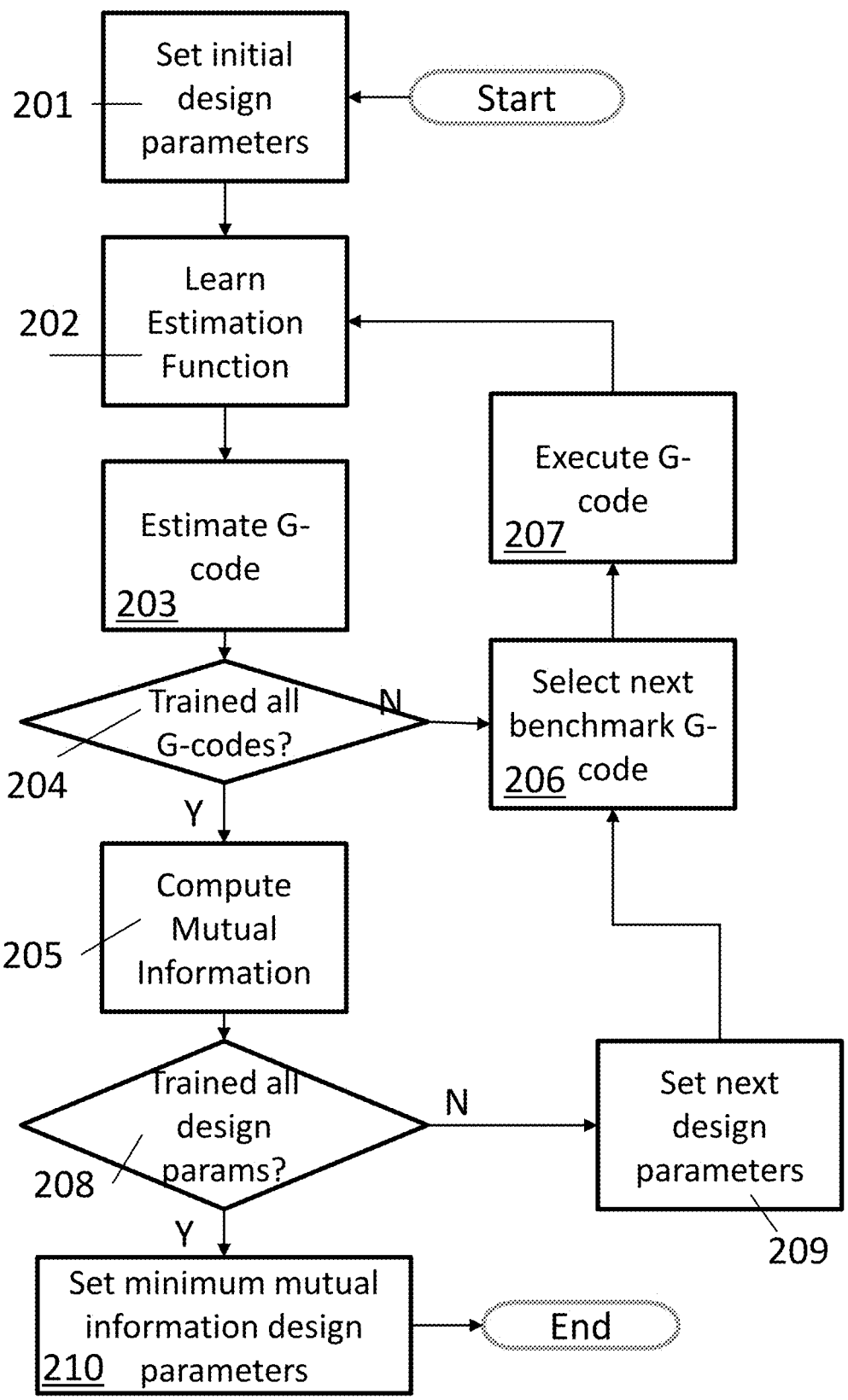
FIG. 10 shows statistical models training process for various system parameters.
Figure 11:
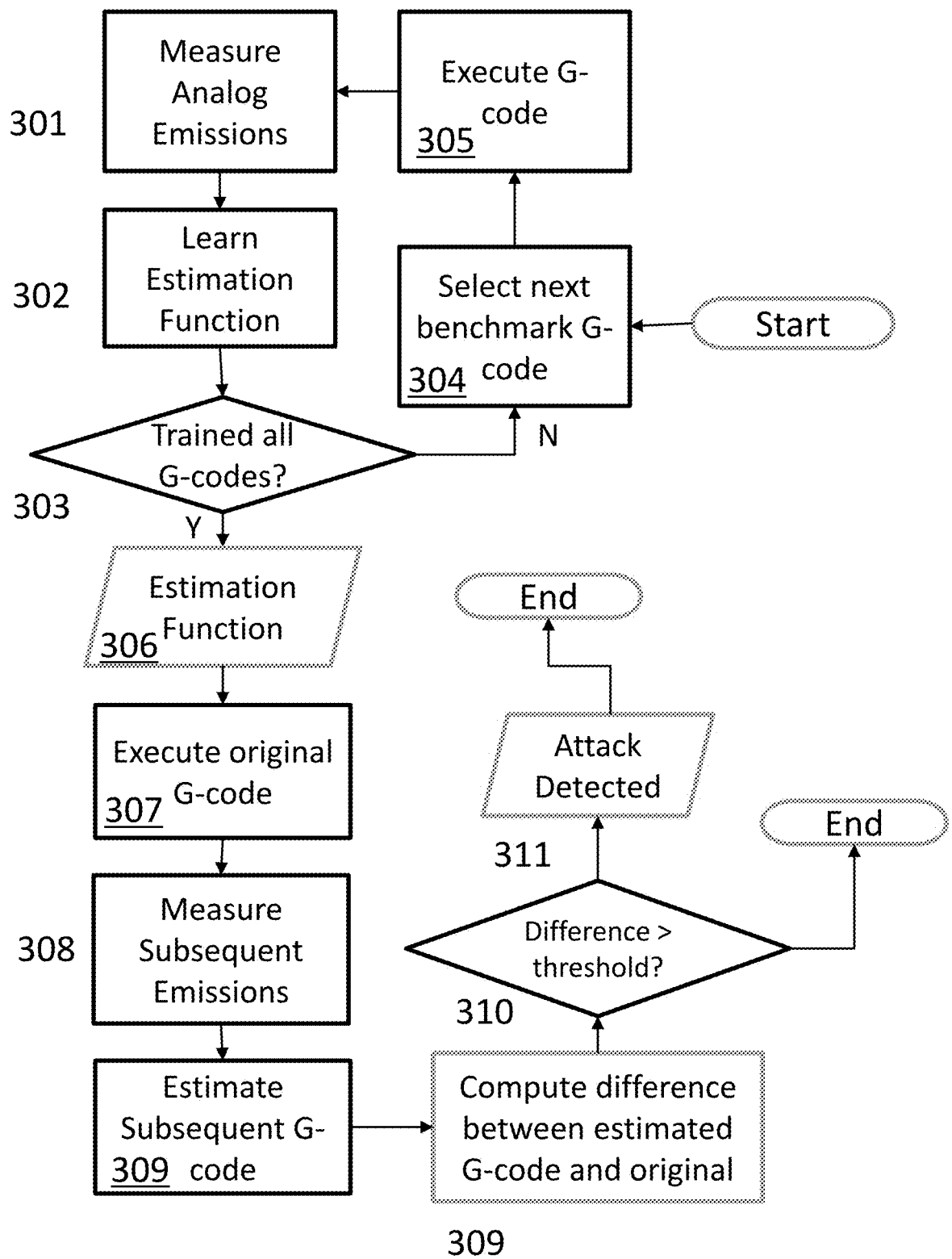
FIG. 11 shows trained statistical models use for inference.

As a test case, an analysis on a flight controller base plate, which is a part of quadcopter that can be printed using a 3D Printer, is presented. It is assumed that the modified firmware, as a result of zero-day kinetic cyber-attack, introduces variation in the certain part of the code by adding 4 mm to the x-axis movement distance. Such small changes in the design of an object can compromise their structural integrity during use, and lead to a catastrophic failure. The original design of the base plate is shown in FIG. 7A. As a result of an attack, minute modification introduced in the design is shown in FIG. 7B. This modification might not be visible to human eyes, however it compromises the structural integrity of the base plate. The KCAD method of the present invention detected the variation in the x-axis introduced in all three layers by the firmware modification attack.

In one embodiment, the present invention features a method of estimating a G-code of a cyber-physical additive manufacturing ("AM") system. In some embodiments, the AM system may comprise a cyber-domain (101). In some embodiments, the G-code may reside in the cyber domain. In some embodiments, the AM system may comprise a physical domain (120). In some embodiments, the physical domain may comprise a manufacturing machine. In some embodiments, the manufacturing machine may have a plurality of side channels. In some embodiments, the G-code may comprise an instruction to the manufacturing machine. In some embodiments, the G-code may be converted by the cyber domain into a set of control signals in the physical domain. In some embodiments, the execution of the control signals may cause the AM system to emit analog emissions in the plurality of side channels in the physical domain. In some embodiments, the physical properties of the analog emissions in the side channels may depend on the composition of the control signals being executed. In one embodiment, the method may comprise some or all of the following steps in a sequential or non-sequential order:

Step (a) may comprise executing at least one benchmark G-codes on the AM system (102), wherein the G-code is converted to control signals (121), wherein the control signals are executed by the AM system (122). Step (b) may comprise measuring a plurality of analog emissions (123) from the plurality of side channels while the G-code is executing (103). Step (c) may comprise repeating steps (a) and (b) for a plurality of benchmark G-codes (105) and control signals, while training a supervised learning algorithm (104) to learn an estimation function (106), wherein the estimation function estimates the control signals of a G-code from a plurality of analog emissions. Step (d) may comprise executing at least one subsequent G-code on the AM system (107). Step (e) may comprise observing at least one subsequent plurality of analog emissions from the plurality of side channels (108). Step (f) may comprise using the estimation function (106) to estimate at least one subsequent set of control signals. Step (g) may comprise computing an estimated G-code from the estimated set of control signals (109).

In one embodiment, the present invention features a method for detecting an attack of a cyber-physical additive manufacturing ("AM") system. In some embodiments, the AM system may comprise a cyber-domain having a G-code. In some embodiments, the AM system may comprise a physical domain having a manufacturing machine. In some embodiments, the AM system may execute a set of control signals. In some embodiments, the G-code may specify the composition of the control signals. In some embodiments, the execution of the control signals may cause the AM system to emit analog emissions in the physical domain. In some embodiments, the physical properties of the analog emissions may depend on the composition of the control signals being executed. In some embodiments, an attack in the cyber domain may comprises modification of the G-code and/or the control signals being executed by the AM system. In some embodiments, the attack may comprise interception and modification of the G-code before printing. In one embodiment, the method may comprise some or all of the following steps in a sequential or non-sequential order:

Step (a) may comprise executing a method to obtain an estimation function (301, 302, 303, 304, 305, 306). Step (b) may comprise executing an original G-code on the AM system (307). Step (c) may comprise measuring the subsequent analog emissions (308). Step (d) may comprise using the estimation function to compute an estimated G-code (307). Step (e) may comprise defining an error threshold (310) for each original control signal. Step (f) may comprise for each pair of original and estimated control signals, calculating an absolute value of a difference between the estimated control signal and the original control signal corresponding to said estimated control signal (309), wherein if the absolute value is outside of the error threshold defined for said original control signal (310), then the attack is detected (311).

In one embodiment, the present invention may feature a method of protecting a cyber-physical additive manufacturing ("AM") system from information leakage. In some embodiments, the AM system may comprise a cyber-domain. In some embodiments, the G-code may reside in the cyber domain. In some embodiments, the G-code may comprise a set of design variables. In some embodiments, the AM system may comprise a physical domain. In some embodiments, the physical domain may comprise a manufacturing machine wherein the manufacturing machine has a plurality of side channels. In some embodiments, the side channels may have analog emissions. In some embodiments, the analog emissions may depend on the control signals. In some embodiments, the G-code may comprise an instruction to the manufacturing machine. In some embodiments, the G-code may be converted by the cyber domain into a set of control signals in the physical domain. In some embodiments, the control signals may depend on the design variables of the G-code. In some embodiments, the execution of the control signals may cause the AM system to emit analog emissions in the plurality of side channels in the physical domain. In some embodiments, the physical properties of the analog emissions in the side channels may depend on the composition of the control signals being executed. In some embodiments, the design variables may influence the physical properties of the analog emission. In one embodiment, the method may comprise some or all of the following steps in a sequential or non-sequential order:

Step (a) may comprise obtaining a benchmark G-code, wherein the G-code has an initial set of values for the plurality of design variables (201). Step (b) may comprise executing a method to obtain an estimated G-code for the initial set of design variables (202, 203, 204, 206, 207). Step (c) may comprise using the benchmark G-code and the estimated G-code to compute a mutual information value for the set of design variables (205), wherein the mutual information is a measure of how accurate the estimated G-code is compared to the benchmark G-code. Step (d) may comprise modifying the design variables of the G-code to obtain a modified G-code and a modified set of control signals (209). Step (e) may comprise repeating steps (b) through (d) a plurality of times, to obtain a plurality of mutual information values for each of the plurality of sets of design variables, wherein the plurality of sets of design variables spans the space of possible design variables (208). Step (f) may comprise selecting the set of design variables corresponding to the minimum mutual information, to obtain an optimal set of design variables (210). Step (g) may comprise, for each future G-code to be executed on the AM system, modifying the set of design variables to the optimal set of design variables to obtain a leakage optimized G-code. Step (h) may comprise executing the leakage optimized G-code on the AM system.

EXAMPLE

The following is a non-limiting example of the present invention. It is to be understood that said example is not intended to limit the present invention in any way. Equivalents or substitutes are within the scope of the present invention.

I. INTRODUCTION AND RELATED WORK

Cyber-physical additive manufacturing systems are at the crux of the next industrial revolution. This is because it provides an easy integration of the cyber and the physical domain for rapid prototyping and tooling of complex, lightweight, and free-form 3D objects. It is estimated that the value of global additive manufacturing market will reach $30.19 billion by 2022. In fact, major industries and agencies such as aerospace, defense, automotive, healthcare, etc., are already incorporating additive manufacturing for prototyping, product development and innovation.

The rosy prospects painted by cyber-physical additive manufacturing systems (also known as 3D printing), however, also comes laden with various research challenges. Especially, due to the incorporation of Cyber-Physical Systems (CPS) in the supply chain and the product life-cycle of manufacturing, the next generation of smart factories will also inherit the security issues associated with it. This will add an extra challenge in meeting the security requirement such as confidentiality, integrity, and availability in manufacturing industry. Attackers have already leveraged various vulnerabilities of the CPS to breach the security of the manufacturing system. Furthermore, it was the third most-attacked industry in 2017 as well.

In additive manufacturing, various attack models have been implemented to demonstrate how the security properties of additive manufacturing can be breached. Workers in the field have demonstrated how a specific attack chain can be selected to compromise the mechanical integrity of the 3D printed objects. They have validated their work through a case study in sabotaging the propellers of a quadcopter printed using additive manufacturing, which eventually caused the quadcopter to fall during mid-flight. Workers in the field have demonstrated how maliciously modified printer firmware can be used to compromise the integrity of the 3D objects. Workers in the field have demonstrated how various analog emissions such as acoustic, electromagnetic, vibration, and thermal can behave as side-channels and reveal valuable Intellectual Property (IP) (such as geometry information) during the printing stage. These side-channels allow attackers to acquire the cyber-domain information (such as the printing instructions) without using the brute force approach.

There are various research works that have tackled the issue of integrity, however, at the time of this invention, only few have worked on thwarting the side-channel attacks. Specifically, works have tackled the issue of minimizing the information leakage in just acoustic side-channel by reducing the mutual information between the side-channel emissions and the cyber-domain data (G/M-code), and fail to provide the implication of mutual information reduction. In manufacturing, attackers are motivated to breach the security of manufacturers for their Intellectual Property (IP) and operations information that is worth a large amount. Although, large body of work have been focused in preventing duplication of the printed 3D object to maintain confidentiality, this work tackles the problem of IP loss during prototyping stage or early stage of product design, before the 3D object is accessible to an attacker. This stage can be crucial for a company as any information leakage at this stage can cause the company to lose IP to competitors.

A. Motivation for Leakage-Aware Security Tool

In additive manufacturing, critical information that needs to be protected are the intellectual properties hidden in the geometry of the 3D objects, machine specific processes, etc. In this invention, the unique geometric properties of the object, which gives their product an edge over other competing products in the market, is considered as the crucial IP. These geometric designs are eventually described and stored in the form of a cyber-domain data, which flows through the digital process chain. The digital process chain of additive manufacturing consists of Computer Aided Design (CAD) tools for modeling the 3D objects, and Computer Aided Manufacturing (CAM) tools for converting the 3D models to slices of 2D polygons, and then generating tool-path (G/M-codes) based on those 2D polygons. These G/M-codes are eventually converted to control signals that actuate the physical components. During actuation, mechanical and electrical energies flows through the system, and may leak the information about the G/M-codes, eventually leaking the IP. An attacker may use multi-channel fusion attacks to reverse-engineer the 3D geometry of an object.

Information leakage from the side-channels may be prevented by reducing the mutual information between the cyber-domain data and the physical emissions. This may be achieved by changing the mechanical structure of the 3D printer to make emissions corresponding to multiple G/M- code actuation identical, adding noise generators to reduce the signal-to-noise ratio in the individual side-channels, or adding secure chambers. Compared to these measures which add cost, recently researchers have demonstrated that it is possible to change CAM tools to minimize the information leakage from the acoustic side-channel. The CAM tool can change process and design parameters in slicing and tool-path generation algorithm without affecting the quality of the 3D object. Moreover, costly countermeasures for intrusively changing the mechanical structure or noise generating sources are avoided.

B. Problem and Research Challenges

Designing a methodology to minimize information leakage in the physical domain through incorporation of security aware solutions in the cyber-domain of the cyber-physical additive manufacturing system poses the following key challenges:

1) Determining the design variables in cyber-domain (computer aided-manufacturing tools such as slicing and tool-path generation algorithm) that can be optimized to minimize the information leakage.
2) Formulating an optimization problem that can be placed in the digital process chain, which can be generalized for all side-channels, and can balance the trade-off between the design variables and the associated costs (leakage amount, printing time, etc.).
3) Understanding the implication of information leakage from the side-channels.

C. Contributions of the Present Invention

To address the above mentioned challenges, a novel methodology is proposed, which is capable of generating information leakage-aware cyber-physical additive manufacturing tool, and consists of:

1) Leakage modeling and quantification for an additive manufacturing system (Section II-A), which highlights the relationship between the G/M-codes and the emissions in the side-channel, and performs information quantification using mutual information.
2) Formulation of an optimization problem (Section II-C), that describes various design variables (orientation θ and travel feed-rate v) to optimize, and provides it as an input to the slicing algorithm and the tool-path generation algorithm in the digital process chain.
3) A case study analysis, for which the success rate is formulated (Section II-D), an attack model is provided (Section II-B), and the 3D object is reconstructed (Section IV-B) to visualize how leakage-aware CAM tool obstructs the reverse engineering of 3D objects from the side-channels.

II. SYSTEM MODELING

Figure 12:
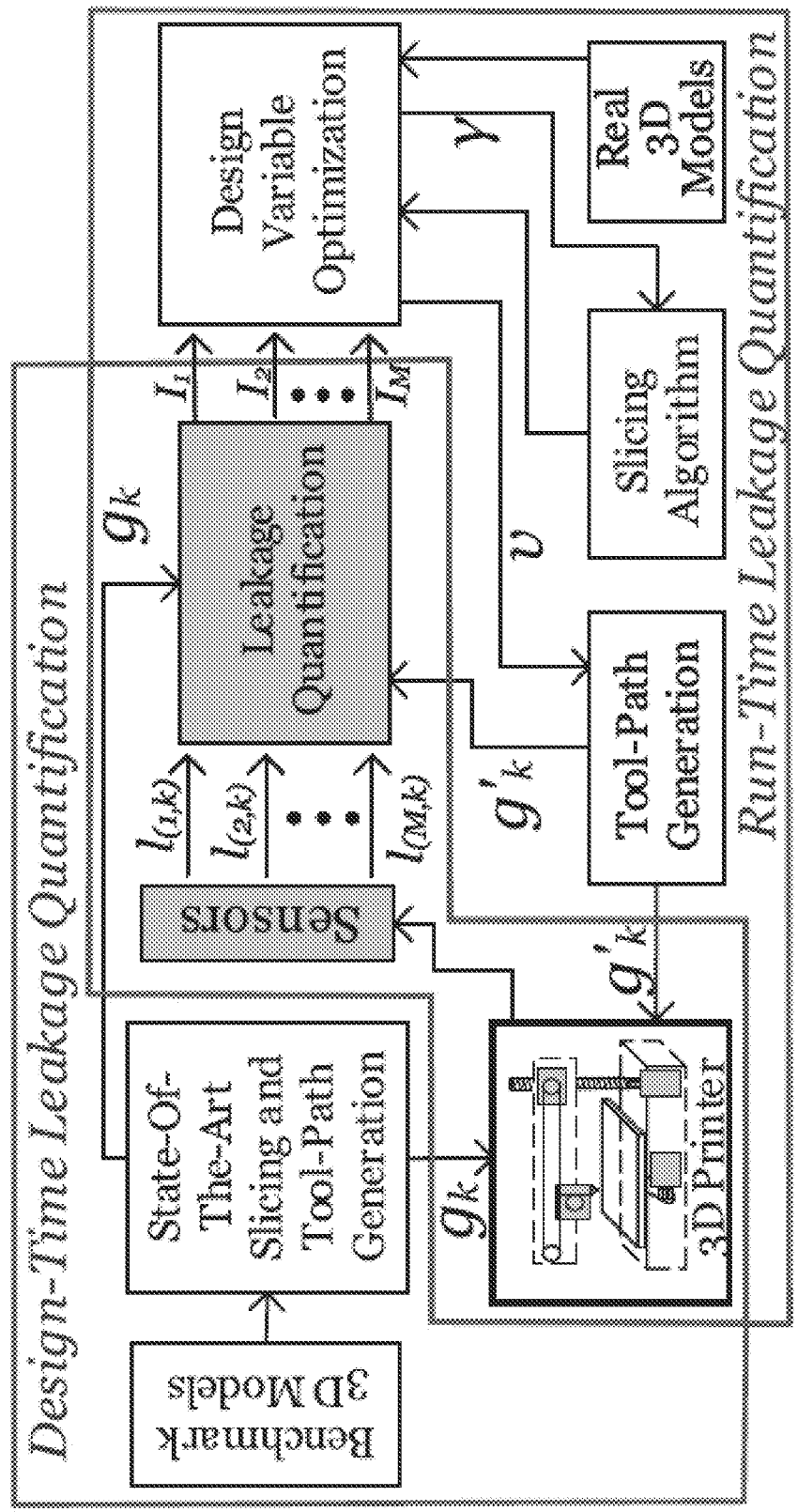
FIG. 12 shows a diagram of a leakage-aware computer aided-manufacturing tool.

The proposed leakage-aware computer aided-manufacturing tool is presented in FIG. 12. Traditional digital process chain lacks the feedback from the physical domain, which can convey knowledge about the amount of information leaked from the side-channels. In the present invention, CAM tools are not only aware of the leakage but also change the design variables to minimize the leakages. The leakage quantification may be done both in design-time and run-time. During design-time, the state-of-the-art slicing and tool-path generation algorithms are used to generate G/M-code $(g_1, g_2, \ldots, g_k)$ corresponding to the benchmark 3D models. These G/M-codes are sent to the 3D printer and the corresponding analog emissions, such as acoustic, power, vibration, and magnetic, are collected using the sensors. The leakage values $(l_{(M, k)})$ from each side-channels (assuming there are M side-channels) and the corresponding G/M-codes $(g_1, g_2, \ldots, g_k)$ are then passed for leakage quantification. The leakage quantification block calculates mutual information (IM) corresponding to each of the side-channels. These values are passed to the design variable optimization block, which optimize the design variables (such as γ, υ, etc.) to minimize the mutual information. Then real 3D models (which contains the IP) are passed through the design variable optimization block which modifies the slicing algorithm and tool-path generation algorithm to produce new G/M-codes $(g_1, g_2, \ldots, g_k)$. During run-time, the leakage-aware CAM tool can be constantly updated to quantify the leakage and optimize the design variables. This may be necessary to make sure that the environmental condition and aging of the physical system do not aid in the leakage of the information.

A. Leakage Modeling and Quantification

For modeling the leakage, it is assumed that there are M side-channels. The G/M-code is the sensitive variable, that an attacker seeks to extract from the 3D printer. Let G represent the sensitive discrete random variable, with probability distribution function p(g), where $g_1, g_2, \ldots, g_k$ represents the possible G-code instructions. Then the leakage from each channel can be written as follows:

$$L_i = \delta_i(G) + N_i, i = 1, 2, \ldots, M \quad (13)$$

where Ni denotes an independent noise (independent from the variable G) in the ith channel, δ(•) represents the deterministic function, and L i is the leakage in the ith channel. Moreover, for each G-code instruction gk, the corresponding leakage may be given as follows:

$$l_{(i,k)} = \delta_i(g_k) + n_{(i,k)}, k = 1, 2, \ldots, K \quad (14)$$

where $n_{(i, k)}$ represents the leakage noise value in the $i^{th}$ channel for the $k^{th}$ leakage measurement, and K is the total number of G-code instructions. Mutual information is used as a metric to quantify the information leakage from each of the channels independently. Given that the joint probability distribution function $p(g, l_i)$, marginal probability distribution $p(g)$ and $p(l_i)$ for the discrete random variables G and $L_i$ is available or can be estimated, the mutual information between the G-code instruction and the leakage can be calculated as follows:

$$I(G; L_i) = \sum_{l_i \in L_i} \sum_{g \in G} p(g, l_i) \log_2\left(\frac{p(g, l_i)}{p(g)p(l_i)}\right) \quad (15)$$

Here, $p(g) = \Sigma_{l_i} p(g, l_i)$ and $p(l_i) = \Sigma_g p(g, l_i)$. The joint probability distribution may be calculated empirically $\hat{p}(g, l_i)$ by acquiring the leakage values in the side-channels to various G/M-codes that are produced by the CAM tool for various 3D objects. Moreover, a data-driven modeling approach may be used to estimate the joint probability distribution as the empirical probability distribution tend to overestimate the mutual information. Furthermore, since base 2 is used for the logarithm, the unit of the mutual information is bits.

B. Attack Model

The side-channel based attack model presented here for a case study have successfully demonstrated the possibility of side-channel attacks on 3D printers. In the adversary/attack model, the main objective of an adversary is to be able to steal/infer the intellectual property inherent in the geometry of the 3D objects, which is described by the G/M-codes. As a medium they will utilize the emissions from the 3D printer, which may behave as a side-channel. The tools used by the attackers in analyzing the side-channels and reverse engineering the G/M-codes are machine learning algorithms which allow them to estimate leakage model function from the emissions. An attacker may be a weak or a strong attacker, depending on their domain knowledge (layer wise printing, high correlation between two consecutive layers, dimension of the 3D printer, machine specific M-codes, etc.). This demarcation is necessary, as geometry information may not be fully stolen from the side-channel. A weak attacker will rely on just the side-channels to estimate the G/M-codes. However, a strong attacker may be able to post-process the estimated G/M-code using domain knowledge to improve the accuracy of the reconstructed 3D objects. For strong attackers, partial reconstruction of the geometry from itself may be enough to infer further geometry details, hence any information from the side-channel may help them in stealing partial or complete intellectual property.

Figure 13:
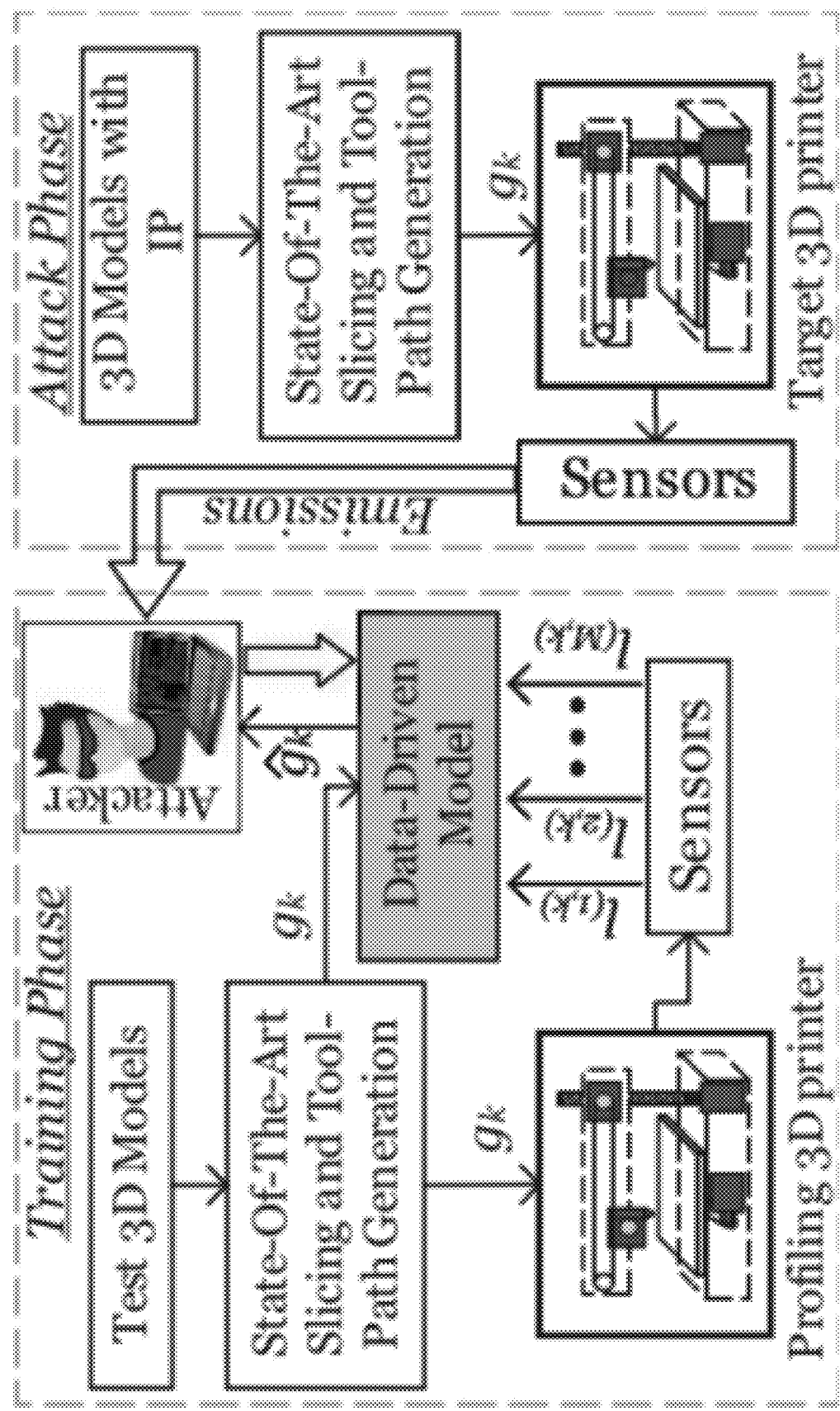
FIG. 13 shows a diagram of a side-channel attack model for a 3D printer.

Furthermore, an attacker goes through two stages to steal the cyber-domain information (G/M-code) (see FIG. 13). The first is the training stage, in this stage we assume that an attacker has high-level access to a 3D printer with similar physical structure to the target 3D printer. By high-level access, we mean that he/she is able to access the digital process chain (CAD and CAM tools). Hence, attacker is able to collect the analog emissions from M side-channels corresponding to the G/M-codes. Then he/she uses data-driven modeling (using machine learning algorithms) approach to estimate the leakage model function $\hat{f}(\cdot, \alpha)$, which is used to estimate the relation between the leakage and the G/M-code. Where a is the tuning parameter for data-driven models. Moreover, attacker can extract various features and perform feature selections from multiple side-channels to estimate the leakage model function. Due to presence of large number of correlated features from multiple side-channel, attacker is assumed to perform feature reduction (using methods such as principal component analysis, singular value decomposition, etc.) In doing so, they perform automatic selection of relevant features from multiple side-channels for reverse-engineering the G/M-code. Using this function, an attacker can estimate the G/M-code based on the analog emissions from the side-channel. $\hat{g}_k = \hat{f}(l_{(1, k)}, l_{(2, k)}, \ldots, l_{(M, k)})$. Various machine learning algorithms can be used to model the leakage model function $\hat{f}_i(\cdot, a)$, such that $$i = \underset{1 \leq i \leq N}{\arg\min} \sum_{k=1}^{K} |g_k - \hat{f}_i(., a)| \quad (16)$$

where N is the various leakage model function estimated by the attacker. The accuracy of the estimated function depends on the amount of information leaked about G/M-code in the side-channels. It is assumed that an attacker has unlimited access to the profiling 3D printer during the training phase and can acquire large amount of leakage values corresponding to G/M-codes to build the leakage model functions. The next phase is the attack phase. In this phase, he/she does not have the high-level access to the digital process chain of the 3D printer. However, they are able to surreptitiously place sensors to monitor the analog emissions with low-level physical access. Low-level access means that they are not able to have digital access to the process chain, however may be able to have closer non-intrusive physical access to the 3D printer. A malicious insider with a low-level access may be an ideal point of contact for an attacker to place the sensors and acquire the analog emissions. Using these emissions, an attacker utilizes the estimate leakage model functions to predict the G/M-codes.

C. Formulation of Leakage-Aware Optimization Problem

In this section, the leakage-aware optimization problem is formulated for CAM tools used specifically for the fused deposition modeling technique based 3D printers, and a demonstration is made of providing feedback to the CAM tool for optimizing various design variables for minimizing the information leakage.

1) Design Variables for Leakage Minimization:

The fundamental principle behind reducing the leakage from the side-channels includes selection of the design variables which can be optimized without substantially affecting the geometry of the 3D objects being printed. This variable may be selected from various stages, either the CAD tools or CAM tools. In the present invention, since the optimization algorithm is incorporated in the CAM tool, design variables are selected from slicing algorithm and tool-path generation algorithm for minimizing the leakage. The exhaustive list of design variables is not presented here, however the proposed methodology can be scaled when other design variables are added. Here, two design variables ($\gamma$, $\upsilon$) are proposed.

Assumption 1:

For the 3D printer, while printing in each layer (the XY-plane), let v be the velocity of the nozzle head (or the extruder from where the filament is deposited) and $\theta$ be the angle made by the line segment being printed with the X-axis. Let $g_i(\theta)$, be a function that gives the mutual information between the G/M-code (with varying v) and the analog emissions from the $i^{th}$ side-channel when the angle between the line-segment and the X-axis is $\theta$. Then for each side-channel there exist angle $\beta_i$ such that $\beta_i = \arg\min_\theta g_i(\theta)$. Where, $0 \leq \beta_i \leq 2\pi$, and i=1, 2, . . . , M.

Remark 1:

For each of the side-channels, changing the angle of the line-segment $\theta$ has corresponding effect of increasing the source of emission. For example, when the angle is $\theta=0°$ corresponds to line-segment being printed parallel to X-axis. Hence, minimum of X and extruder's stepper motor have to be active. When $\theta=45°$, line-segment is printed with equal speed v in both X and Y-axes. Hence, minimum of three stepper motors have to be active (X, Y and the extruder). Due to varying number of sources of emission added with varying $\theta$, mutual information for different $\theta$ will vary accordingly. Moreover, mutual information will be low if the complex axis movements leakages cannot be distinguished. Hence, there may exists a certain angle for which minimum $I(G; L_i)$ value can be obtained.

In 3D printing, there are large number of straight line segments, optimizing the $\theta$ for each segment to minimize leakage can affect the convergence of the optimizing algorithm. Rather, Principal Component Analysis (PCA) is used to find the common orientation angle of all the line segments. In digital process chain, the 3D model is converted to a file with tessellated triangles that describe the geometry. From this file, using the cross product, a vector, $\vec{u}$, normal to the plane of the triangular surface is calculated. Next, PCA is performed on the collection of vectors $\vec{u}$ calculated for all the triangular surfaces. Then, the first principal component which has the highest eigenvalue is extracted. This value represents the most common normal vector of all the line segments. Here, $\gamma$ is defined as the angle of the vector $\vec{u}'$ which is perpendicular to the first principal component of the vector $\vec{u}$. This is the first design variable.

Assumption 2:

Given the nozzle movement to print a line segment of length l in xy-plane, let $\upsilon_x$ and $\upsilon_y$ be its velocity in x and y-axis respectively. Where travel feed rate is $\upsilon = \sqrt{\upsilon_x^2 + \upsilon_y^2}$. Then there exists $\upsilon'_i \in R$ such that $\upsilon'_i = \arg\min_\upsilon g_i(\upsilon)$. Where, $g_i(\upsilon)$ gives the mutual information between the G/M-code (with varying $\theta$) with speed $\upsilon$ and the analog emissions from the $i^{th}$ side-channel.

Remark 2:

$\upsilon'$ values that will achieve the minimum mutual information in the side-channel lie in the higher travel feed ranges. Considering the acoustic side-channels, first the higher frequency excitation due to faster travel feed-rates will cause reduction in the amplitude of the vibration as most of the time this excitation force act in opposing direction of the vibration, and second, the leakage signal will be corrupted quickly by new analog emission from the next G-code. Due to this, the sample of data collected for the G-codes with large travel feed-rate, will be less in number, and may be contaminated by other G-code leakage signals. Hence, due to mixture of the leakage signals for different G-code, the mutual information extracted will be low.

State-of-the-Art CAM Tools:

Current slicing algorithms for fused deposition modeling based desktop 3D printers do not consider the information leakage through the side-channels and have tool-path generation that are optimized only for machining efficiency (such as time, material deposition, precision, etc.).

2) Optimization Problem Statement:

For minimizing the information leakage from side-channels, based on assumptions 1 and 2, a new leakage-aware algorithm is proposed. The design variables are defined as, $0 \leq \gamma \leq 2\pi$, and $\upsilon = \sqrt{\upsilon_x^2 + \upsilon_y^2}$. Where $\upsilon_x \in R$, and $\upsilon_y \in R$. For the speed in x and y axis, the two variable bounds are $\upsilon_{xmin} \leq \upsilon_x \leq \upsilon_{xmax}$ and $\upsilon_{ymin} \leq \upsilon_y \leq \upsilon_{ymax}$. Where $\upsilon_{xmin}$ and $\upsilon_{ymin}$ are the minimum machine specific travel feed-rate in x and y axis respectively, and $\upsilon_{xmax}$ and $\upsilon_{ymax}$ the maximum machine specific travel feed-rate in x and y axis respectively. Here, a simple constraint $T \leq kT_{original}$ is used. Where $T_{original}$ is the printing time of the state-of-the-art slicing and tool-path generation algorithm, and $k \geq 1$ is the user defined constant. The mutual information between the G-code and the leakage signal $l_{\gamma i}(G; L_i)$ and $l_{\upsilon i}(G; L_i)$ is calculated either at design-time or at run-time by collecting the various analog emissions corresponding to the G/M-codes of various 3D objects. Then, using a non-linear polynomial functions $f_{\gamma i}(l_{\gamma i}, \gamma_i)$ and $f_{\upsilon i}(l_{\upsilon i}, \upsilon_i)$, the relation between the mutual information and the design variables in different side-channels (acoustic, vibration, power, and electromagnetic) can be estimated. Then, for reducing the mutual information between the analog emission and the design variables, the multi-objective optimization function can be given as follows:

$$(\gamma, \upsilon) = \arg\min_{(\gamma, \upsilon)} (f_{\gamma_1}, f_{\gamma_2}, \ldots, f_{\gamma_M}, f_{\upsilon_1}, f_{\upsilon_2}, \ldots, f_{\upsilon_M}) \quad (17)$$

Based on the value given by the optimized design variable, slicing and tool-path generation will generate new G-code with minimum information leakage. The algorithm to generate G/M-codes is shown in Algorithm 3. The inputs to the algorithm are the probability distribution ($\hat{p}_i(\gamma, l_i)$, $\hat{p}_i(\upsilon, l_i)$) estimated by collecting the leakage and the G/M-code data while printing the benchmark 3D models, and STL file of the original 3D objects. In line 1, step size for estimating the cost function based on the design variables $\gamma$, $\upsilon$ are defined, along with their range. Then from line 2 to 6, using the probability distribution $\hat{p}_i(\gamma, l_i)$, $\hat{p}_i(\upsilon, l_i)$, various mutual information values are calculated for the varying design variables. In line 6, polynomial function is used to estimate the relation between the design variables and the mutual information calculated in line 5. Then based on the description of the problems statement, mixed multi-objective nonlinear integer programming is used to optimize the design variables. In line 8, the modified design variables are passed to the slicing and tool-path generation function to generate a G-code with minimum leakage, which is finally returned in line 9.

---

Algorithm 3 Leakage-Aware G-Code Generation

Input: Empirical or data-driven joint distribution $\hat{p}_i(y, l_i)$, $\hat{p}_i(v, l_i)$
Input: Output of CAD Tool (STL Files)
Output: Modified G-code g'
1  Define step size $\Delta_y$, $\Delta_v$ and range $\min_y$, $\min_v$ and $\max_y$, $\max_v$
2  for i = 1 : M do
3     for each j ∈ (y, v) do
4        for k = $\min_j$ : $\Delta_j$ : $\max_j$ do
5           $l_{(j, k)} = l_k(G; L_i)$ // Based on $\hat{p}_i(y, l_i)$
            // and $\hat{p}_i(v, l_i)$
6     Estimate Nonlinear function $f_{j_i}$
7  Optimize
   arg $\min_{(y, v)}(f_{y_1}, f_{y_2}, \ldots, f_{y_M}, f_{v_1}, f_{v_2}, \ldots, f_{v_M})$
8  g' = SliceandToolPathGeneration(y, v, STL File)
9  return g'

---

D. Success Rate of the Adversary

Mutual information provides an idea about how much information is available to an attacker for the exploitation. However, it does not provide information about the capability of an attacker. A strong attacker may be able to exploit little information for a successful attack, whereas, a weak attacker may not be able to exploit the information available for the attack. Hence, in addition to the mutual information, success rate of an attacker helps in demonstrating how side-channels can be leveraged for breaching the confidentiality of the 3D printer. Hence, the success rate based on the adversary model presented in Section II-A was also analyzed. It is assumed that an attacker has unlimited access to a replica of the manufacturing system, and by using state-of-the art learning algorithms he/she is able to generate data-driven leakage model of the system.

3D printer instructions can be divided into two types. The first type is called G-codes and they are responsible for the movement of the nozzle in different axis. The second type is called M-codes, and they are responsible for controlling the parameters of the machine beside motion. An example of a G type instruction is a command which results moving the nozzle of a 3D printer for a certain distance, with a certain angle and speed. On the other hand, an example of the M type instructions is an instruction which sets the acceleration rate for the stepper motor. Here, for the sake of simplicity, it is assumed that the number of M type instructions are limited, and do not impact the geometry of the 3D objects, which is the case in 3D printers. Hence, the focus is given only to G type instructions for measuring the success rate. The G type instructions or the G-codes consists of instruction such as i) movement axis, ii) distance moved in each axis, iii) speed of motion in each axis, and iv) extrusion amount. The extrusion amount is calibrated to maintain the optimal print quality and is fixed in most of the CAM tools. It does not affect the geometry of the object being printed. The Z-axes movement occurs every layer with a constant height, and can be distinguished or inferred with ease. In state-of-the-art slicer used in the CAM tools, such as Cura, speed does not change dynamically. Rather, most of the time, it has constant predefined values for each stage (first layer, outer boundary, inner filling and traveling without printing) of printing. Since speed variation in each of the stages are drastically different, they are easier to classify. Hence, the most challenging information that an attacker may require to extract from a G-code is the geometry of object being printed in each XY-plane. This information can be abstracted in terms of angle and length of the line segment being printed by each G-code.

Based on these assumptions, the G-code instruction is reduced to $E_{(\theta, d)}$, where $0<\theta<360$ is the angle between the movement direction of a line segment and the X axis, d is the travel length. Then for calculating the success rate of an attacker, only measure of how successfully he or she is able to reconstruct $\theta$ and d for each line segment is required. Let us represent the sequence of G-codes as $\{E_1, E_2, \ldots, E_i\}$, with $E_i = E_{(\theta_i, d_i)}$. Let $L_i$ be the leakage corresponding to $E_i$. Then an attacker will utilize the function $\hat{f}(\bullet, \alpha)$ estimated using Equation 16 to infer about $E_i$ based on $L_i$. Estimated $\hat{E}_i$ consists of $\hat{\theta}$ and $\hat{d}$.

In our attack model, attacker estimate $\hat{\theta}$, $\hat{d}$ independently. Hence, there are two functions $\hat{\theta} = \hat{f}_\theta(\bullet, \alpha)$ and $\hat{d} = \hat{f}_d(\bullet, \alpha)$. Now, the success rate is formulated in terms of accuracy in reconstruction of each of the line segment using $\hat{\theta}$ and $\hat{d}$.

Figure 14:
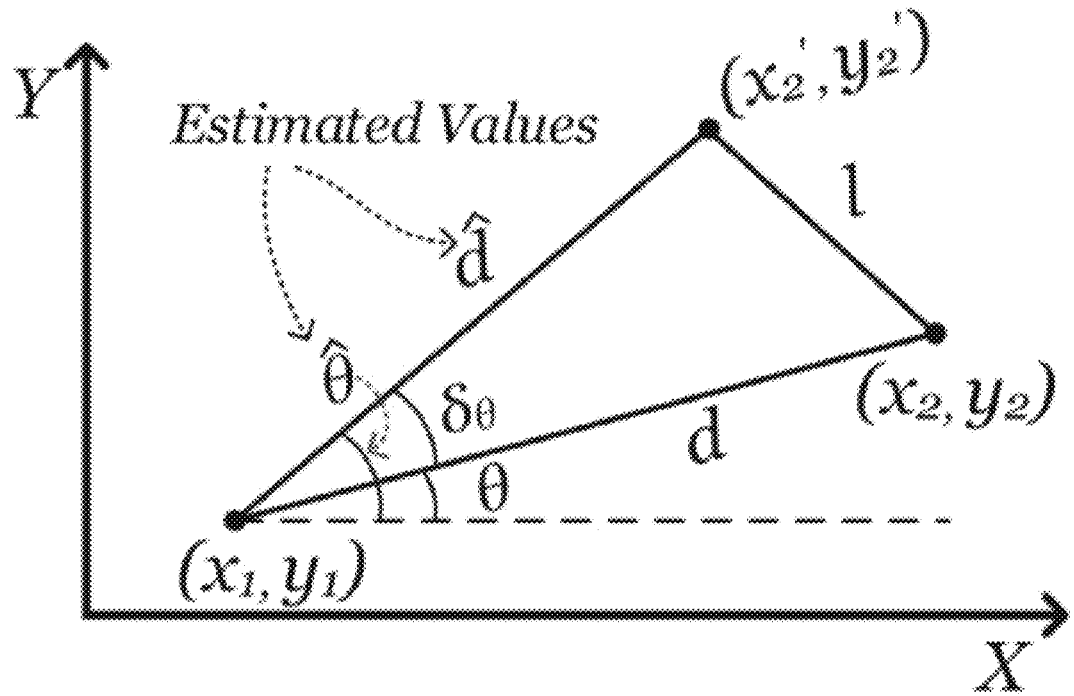
FIG. 14 shows a graph of success rate formulation for each G-code instruction.

For doing so, let $(x_1, y_1)$ and $(x_2, y_2)$ be a line segment a G-code instruction prints on a XY-plane. As explained earlier, this segment can be explained in terms of polar coordinates using $\theta$ and d. Now, let the estimated polar coordinate value be $\hat{\theta}$ and $\hat{d}$ as shown in FIG. 14. Then, the success rate is defined in terms of a parameter l, which can be given as follows:

$$l = \sqrt{d^2 - 2d\hat{d}\cos(\delta_\theta) + \hat{d}^2} \quad (18)$$

Then the success rate is measure of how accurate is l, given as follows:

$$\text{Success Rate } (SR) = \frac{1}{n}\sum_{i=1}^{n} S_l \quad (19)$$

Where $S_l = 1$ when $|\hat{l}_i - l_i| < e_l$ and 0 otherwise, and n is the total number of G-code instructions being reconstructed.

To prove that success rate encompasses accuracy estimation of both $\theta$ and d, three cases are considered. First, let angle estimation be 100% accurate. In that scenario, $\delta_\theta = 0$, then $l = \pm(d - \hat{d})$ from Equation 18, which shows that l still depends on the estimation of d. In second case let us assume that estimation of d is 100% accurate, then $d = \hat{d}$. Then Equation 18 reduces to $l = \pm d\sqrt{2 - 2\cos(\delta_\theta)}$. It shows that in such scenario l still depends on estimated value of $\theta$, as $\delta_\theta = \hat{\theta} - \theta$. In the final case, let estimation of $\theta$ and d be 100% accurate, then $\delta_\theta = 0$ and $\hat{d} = d$. Then from Equation 18, $l = \sqrt{d^2 - 2dd\cos(0) + d^2} = \sqrt{d^2 - 2d^2 + d^2} = 0$, making success rate 100% accurate as well. Hence, this metric will give the total success rate of the G-code instruction in terms of $\hat{\theta}$ and $\hat{d}$.

III. EXPERIMENTAL RESULTS

Figure 15:
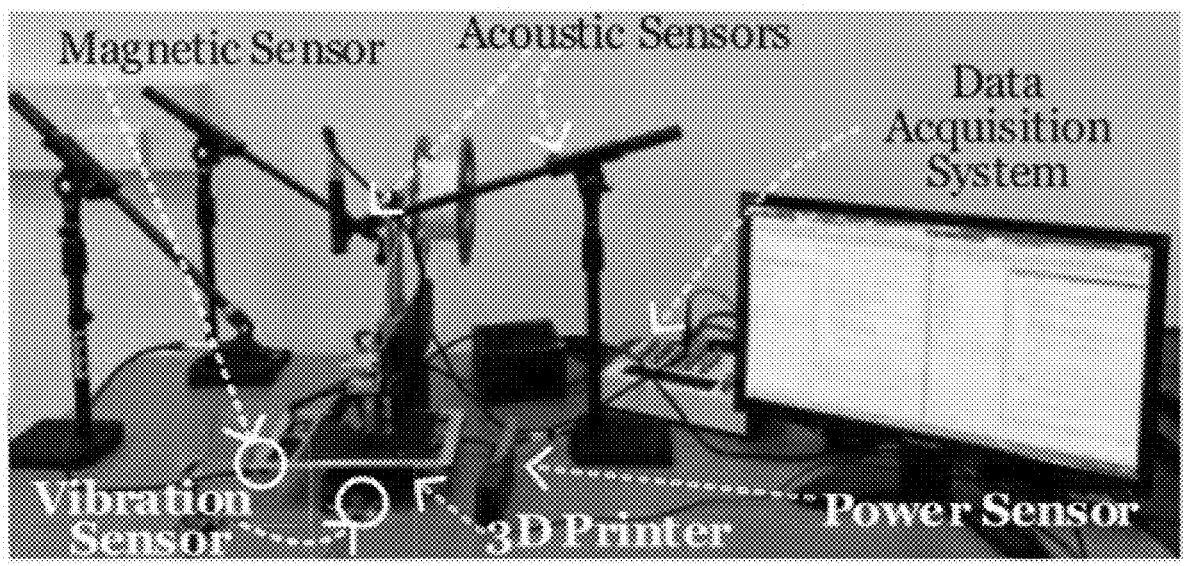
FIG. 15 shows a photograph of an experimental setup with multiple sensors.

The experimental setup for the leakage-aware computer aided manufacturing tool is shown in FIG. 15. In this work, leakage is also considered from the power, vibration, and the magnetic side-channels. The setup consists of a fused deposition modeling based desktop 3D printer. Three AT2021 cardioid condenser audio sensors are placed parallel to X, Y and Z-axis, respectively and treated as individual channels to consider sound emanation in multiple direction. The vibration sensor (Adafruit triple-axis accelerometer) is placed at the static part of the 3D printer, measuring vibration in all three axes. A current clamp is used to non-intrusively measure the current being passed to the main circuit board of the printer from a power supply. A Honeywell's magnetometer (HMC5883L) is used to measure the magnetic fluctuation around the 3D printer. Beside the current clamp, most of other sensors (audio, vibration, magnetic, etc.) are all present in modern smartphones, and have been used in an attack model for breaching the confidentiality.

Since four side-channels are used, here, M=4. Audio sensors placed in different axis are not considered as different channels, rather data from them are fused together and treated as a single side-channel. From the raw signals collected from these sensors, power spectral density in the frequency range of 60 Hz to 10 kHz is calculated, principle components of the corresponding power spectral density are analyzed, and the mutual information between these principle components and the design variables are measured. In our experiment, we have considered only design-time leakage quantification and mutual information calculation. Which means that the mutual information for various design variables are only calculated once and are not updated.

A. Mutual Information

In this section, analysis between the mutual information and the design variables is presented. This demonstrates how the non-linear function in line 6 of Algorithm 3 can be estimated.

1) Design Variable—$\gamma$:

$\gamma$ is varied from 0° to 90° with the step size $\Delta_\gamma = 10°$. For estimating the joint probability function $\hat{p}(\gamma, l_i)$, $\gamma$ is distributed uniformly, and the corresponding analog emissions from the side-channels are collected. This joint probability function $\hat{p}(\gamma, l_i)$ is then used in calculating the mutual information using Equation 15.

Figure 16:
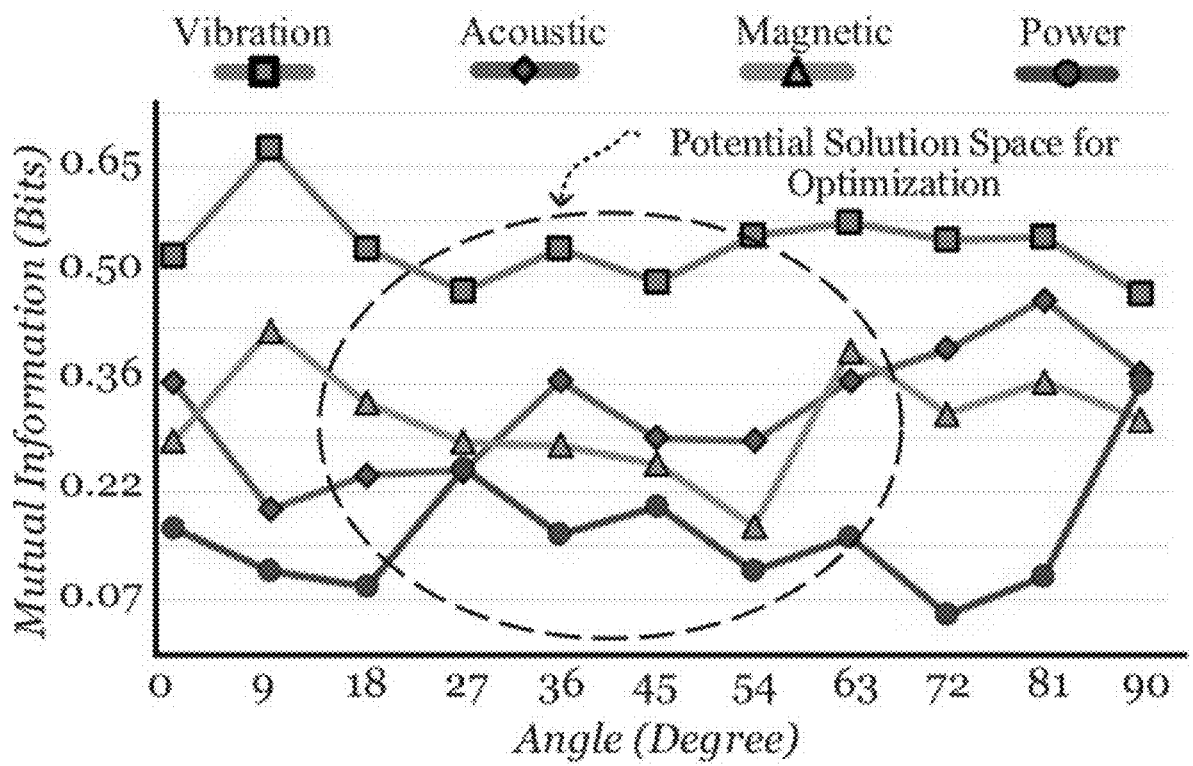
FIG. 16 shows a graph of mutual information between angle ($\gamma$) and leakage, with total angle entropy of 3.4594 bits.

In FIG. 16, mutual information between the first principle component of the power spectral density values of the four analog emissions and the design variable $\gamma$ are presented. The total entropy of the design variable ($\gamma$) is $\log_2(11) \cong 3.4594$ bits. It can be observed that for the design variable $\gamma$ vibration analog emission give more information leakage compared to the other emissions. For motion in XY-plane, since $\upsilon$ is constant for printing a single line-segment, varying $\gamma$ changes the $\upsilon_x$ and $\upsilon_y$ instead (as $\upsilon = \sqrt{\upsilon_x^2 + \upsilon_y^2}$). This means varying $\gamma$ results in actuation of stepper motor moving in X and Y-axis with different angular speed. For vibration side-channel, change of angular speed of stepper motors will result in change of acceleration measured in X and Y-axis, immediately. The acoustic side-channel would acquire this variation in acceleration of sound pressure only when the surface of the 3D printer has been excited. This causes the vibration side-channel to pick more information about $\gamma$ variation than acoustic side-channel. The low-field magnetic sensors used in the experiment measures how the mechanical components of the 3D printer affect the strength and directional of the earth's magnetic fields. Variation in $\gamma$ causes the metallic part of the FDM 3D printer to cut the earth's magnetic field at varying rate. Hence, the variation of $\gamma$ may be inferred from the magnetic side-channel. The power side-channel have lowest mutual information with variation of $\gamma$. The power signal is one dimensional compared to other emission which measure the signal variation in more than one dimension (X, Y or Z axis). Hence, it is intuitive that it leaks less information compared to the other side-channels. From FIG. 16, it may also be observed that single axis movement (when $\gamma=0$ and $\gamma=90$) have more mutual information and thus leak more information compared to multiple axis movements (as there is emission from multiple components of the 3D printer).

2) *Design Variable—v:*

The travel feedrate ($\upsilon$) is varied from 700 mm/min to 3300 mm/min (which is the range for the given 3D printer) with the step size v=200 mm/min, to demonstrate the relation between the design variable $\upsilon$ and the mutual information. Similar to $\gamma$, the joint probability function $\hat{p}(\gamma, l_i)$ is estimated by collecting the analog emissions for the uniformly distributed travel feedrate values.

Figure 17:
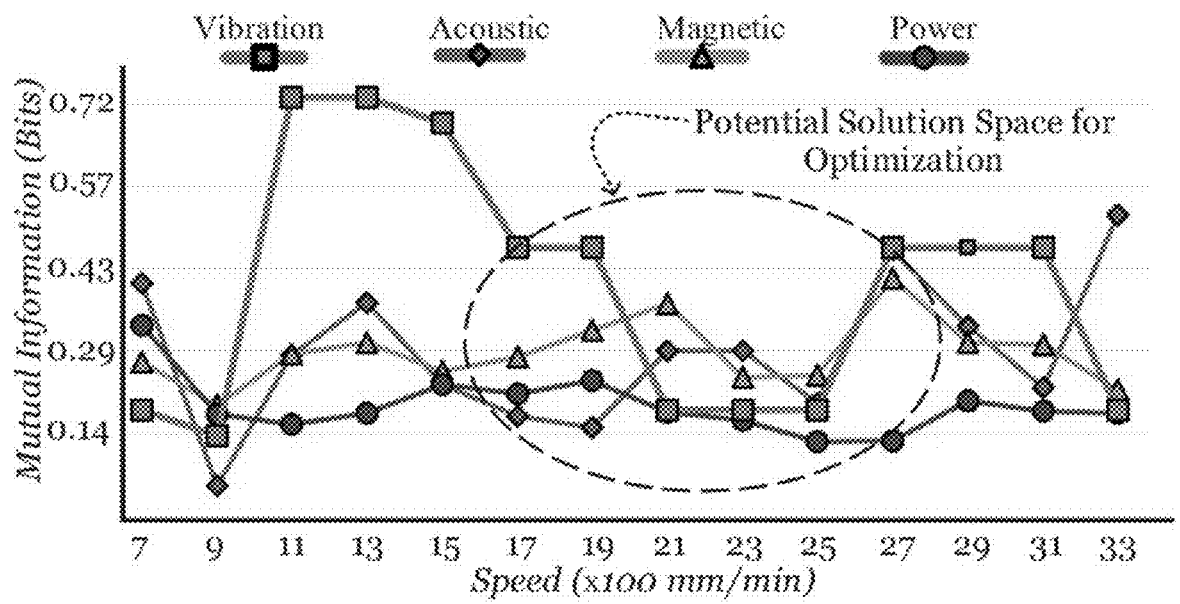
FIG. 17 shows a graph of mutual information between speed ($\upsilon$) and leakage, with total angle entropy of 3.8074 bits.

The total entropy of the design variable ($\upsilon$) is $\log_2(14) \cong 3.8074$, as there are 14 speed values. In FIG. 17, the mutual information between the first principal component (with the highest eigenvalue) of the power spectral density and the varying travel feedrate for vibration, acoustic, power, and magnetic emissions are presented. When the travel feedrate is increased in the G/M-code, the stepper motor driver increases the rate of current passing through the electromagnetic stator core of the stepper motor. The presence of a permanent rotor and the electromagnetic stator with a varying rate of constant current supply makes stepper motor capable of producing audible sound. Moreover, the frame in contact with the stepper motor helps the vibration to be conducted throughout the mechanical frame of the 3D printer, and allow the vibration side-channel to pick subtle variation even before the sound is emanated in the air. Moreover, the varying rate of current supply fluctuates the power consumption in each of the stepper motors used for actuating the G/M-code. The changing current rate affects the magnetic field created in the stator, however, the sensor used in our experiment is not able to capture these small variations of magnetic field. However, the varying travel feedrate change the rate of movement of the mechanical structure, which affect the magnetic field of the earth. This can be captured by the magnetic sensors. From FIG. 17, it can be observed that, for speed variation, vibration side-channel reveals more information compared to other side-channels. As explained earlier, the vibration side-channel is able to capture the minute variation in vibration caused by the variation of the travel-feedrate before the acoustic side-channel, resulting in it having higher mutual information than the acoustic side-channel. Moreover, the mutual information is higher for the lower speeds, lower for the medium range speeds and again higher for the faster speeds. This may be due to the fact that the 3D printer has certain resonant frequencies caused by the cumulative movement and vibration of the individual components, and the speed ranges causing the vibration closer to resonant or harmonics of the resonant frequencies leak more information. The power side-channel have lower mutual information compared to others, this may be due to the fact that the base plate heater and the heater in the nozzle of the 3D printer consume larger current, and variation of stepper motor current fluctuation have lower SNR causing lower mutual information between the power leakage values and the G/M-code.

The optimization algorithm utilizes the non-linear relation estimated in FIG. 16 and FIG. 17 to minimize the mutual information between the analog emissions and the cyber-domain data to effectively reduce the information leakage.

B. *Test with Benchmark 3D Models*

Figure 18:
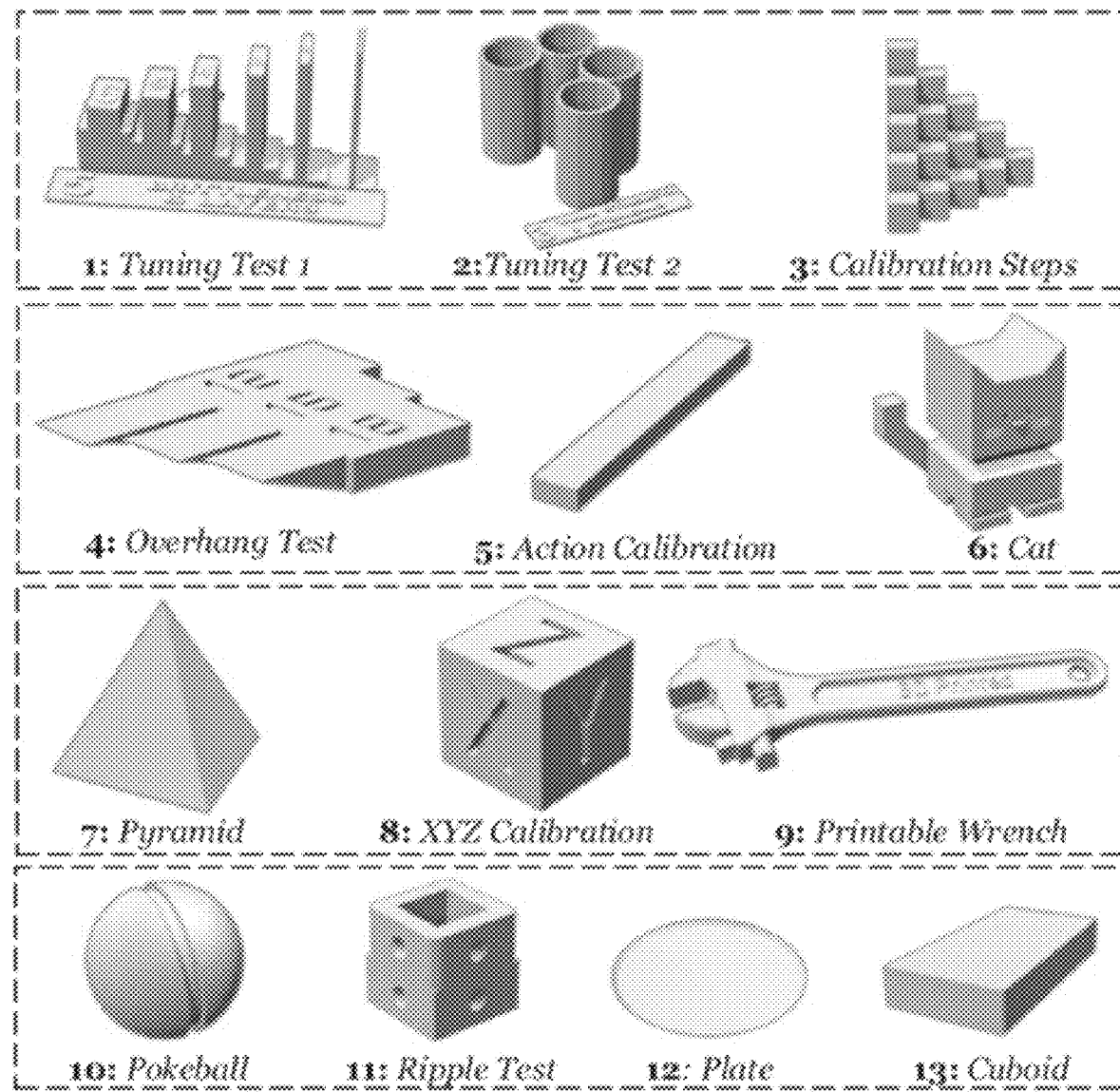
FIG. 18 shows depictions of the benchmark 3D objects used for testing the leakage-aware computer aided manufacturing tool.

The CAD models of the benchmark models are selected that cover wide-variation in G/M-codes. The selected benchmark 3D models are shown in FIG. 18. Some of these objects (numbered 1, 2, 3, 4, 11, and 8) are selected because they are used for calibrating and tuning the 3D printer where as other (numbered 5, 6, 7, 9, 10, 12, and 13) are selected due to the variation in complexity of the design. For each of these benchmark model, mutual information between the G-codes and each of the side-channels was calculated before and after changing the design variables ($\gamma, \upsilon$). FIGS. 19, 20, 21, and 22 show the results of mutual information calculation for acoustic, power, magnetic, and vibration side-channels, respectively.

Figure 19:
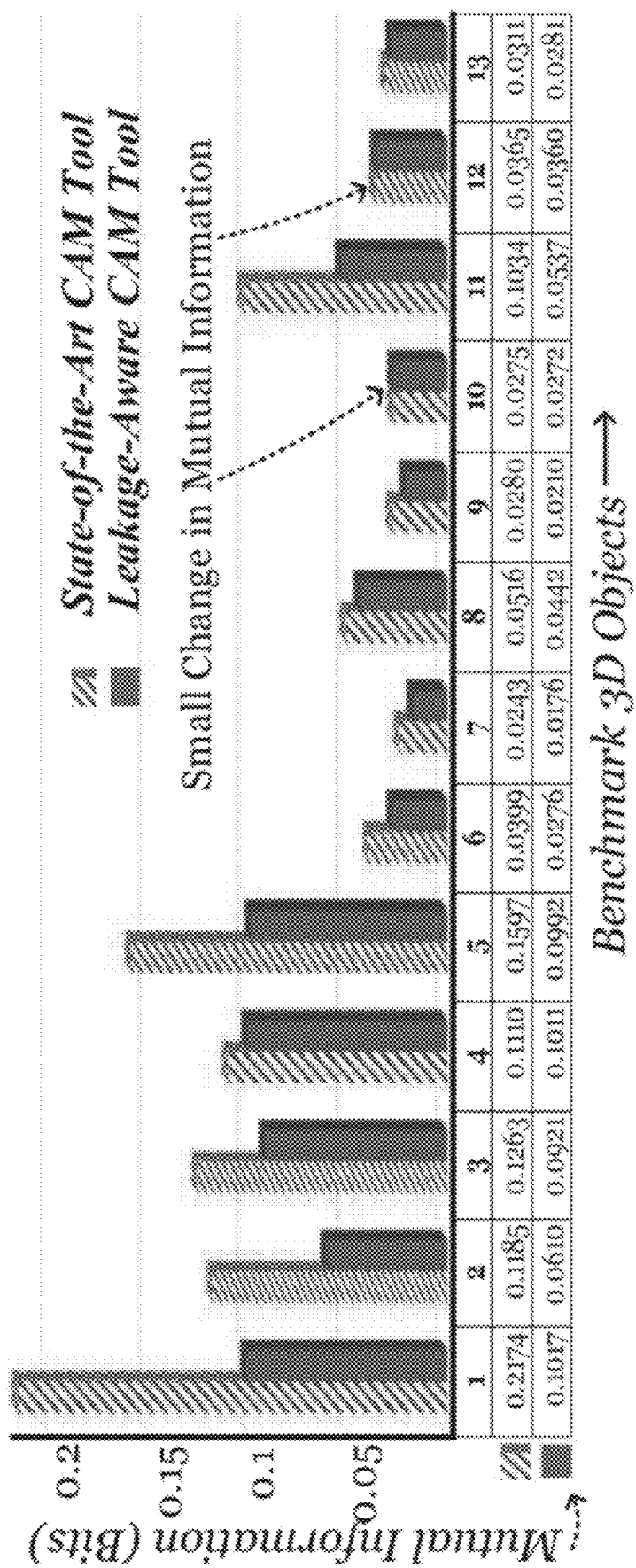
FIG. 19 shows a graph of mutual information between G-codes of benchmark 3D models and acoustic side-channel.

For acoustic side-channel, the average drop of mutual information by 24.94% is obtained across all the benchmark models (see FIG. 19). However, for object number 10 and 12 (see FIG. 18) there is only minute change in mutual information rather than large reduction when the leakage-aware slicing and tool-path generation algorithm is used.

This may be due to the fact that objects 10 and 12 consists of geometric structures (spherical and circular) that do not benefit from design variable $\gamma$ (as the change in $\gamma$ does not introduce variation in the orientation of the spherical and the circular objects). However, real-world objects are not just spherical or circular, and the mutual information will decrease when leakage-aware CAM tool is used.

Figure 20:
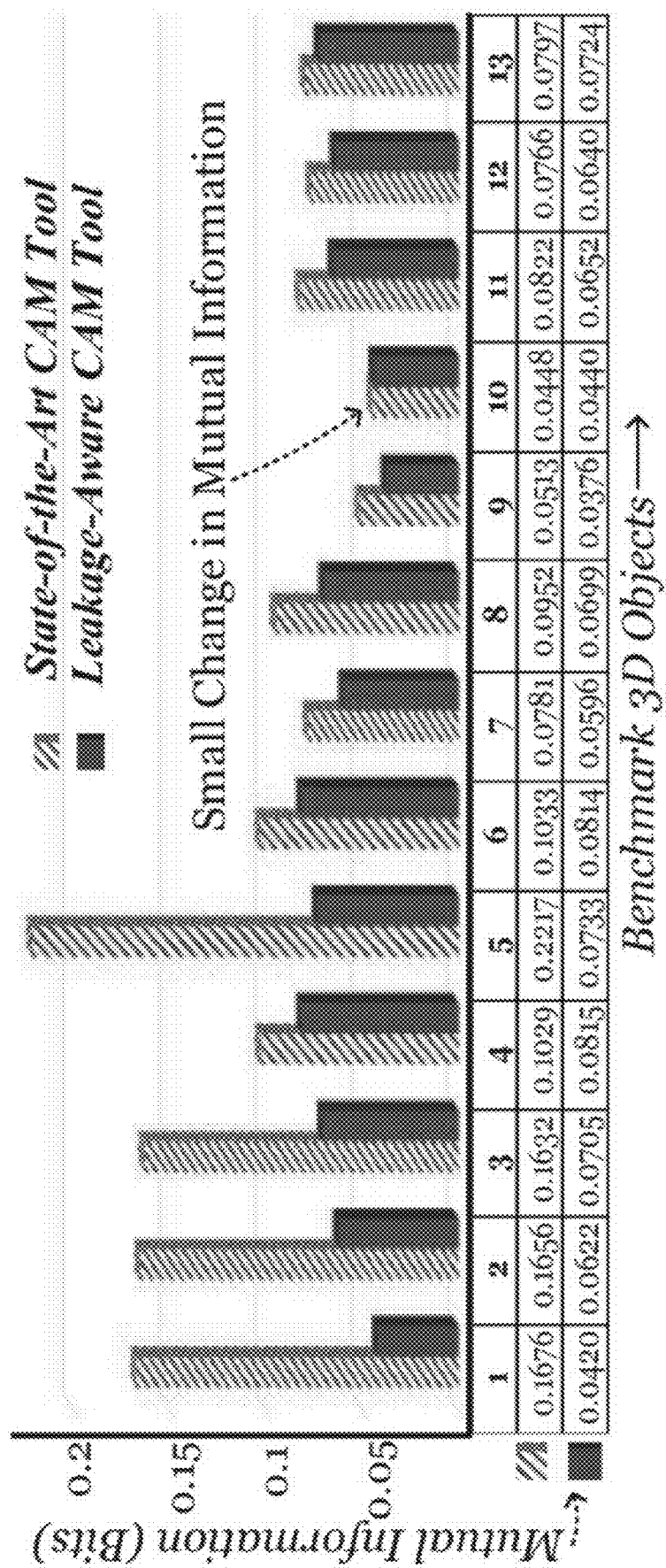
FIG. 20 shows a graph of mutual information between G-codes of benchmark 3D models and power side-channel.

For power side-channel, the average drop of 32.91% in mutual information is obtained across all the benchmark models. As shown in FIG. 20, the mutual information dropped for all the benchmark models except object 10 (only minute change was observed). Unlike other side-channels, power side-channel measures data only in one dimensional (unlike acoustic, vibration, and magnetic that measure fluctuation in all X, Y, and Z-axis).

The variation in the instantaneous power of the 3D printer occurs due to specific activation sequence of various components. For Spherical geometry like object 10, due to symmetric property, the variation in $\gamma$ does not result in change in the sequence of activation drastically.

Figure 21:
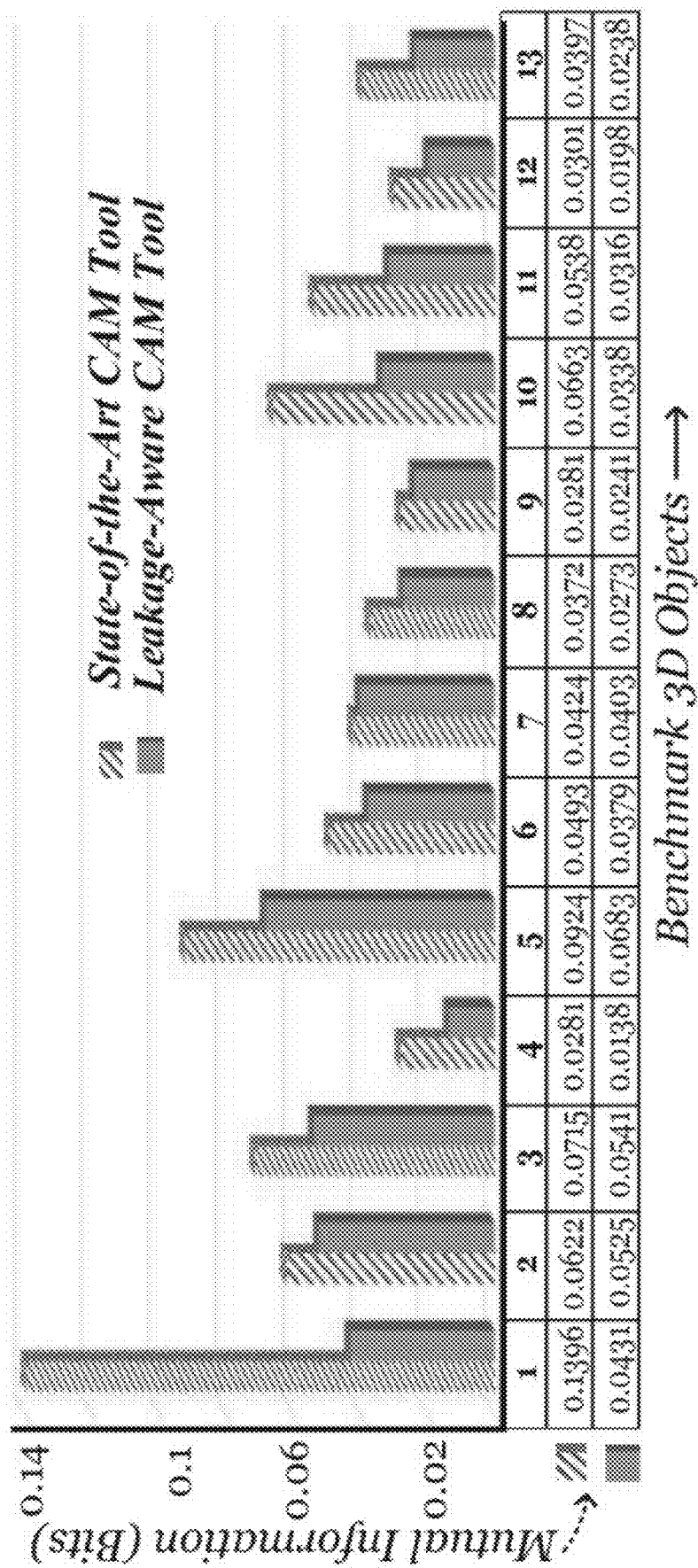
FIG. 21 shows a graph of mutual information between G-codes of benchmark 3D models and magnetic side-channel.

For magnetic side-channel, the average drop of 32.29% in mutual information is obtained across all the benchmark models (see FIG. 21). For all side-channels the objects that benefited the most in reducing the mutual information were object 1 and object 5 (see FIG. 18). This is due to the fact that these objects are stretched in either X or Y axis and hence changing the $\gamma$ drastically changes its orientation, thus affecting the analog emissions.

Figure 22:
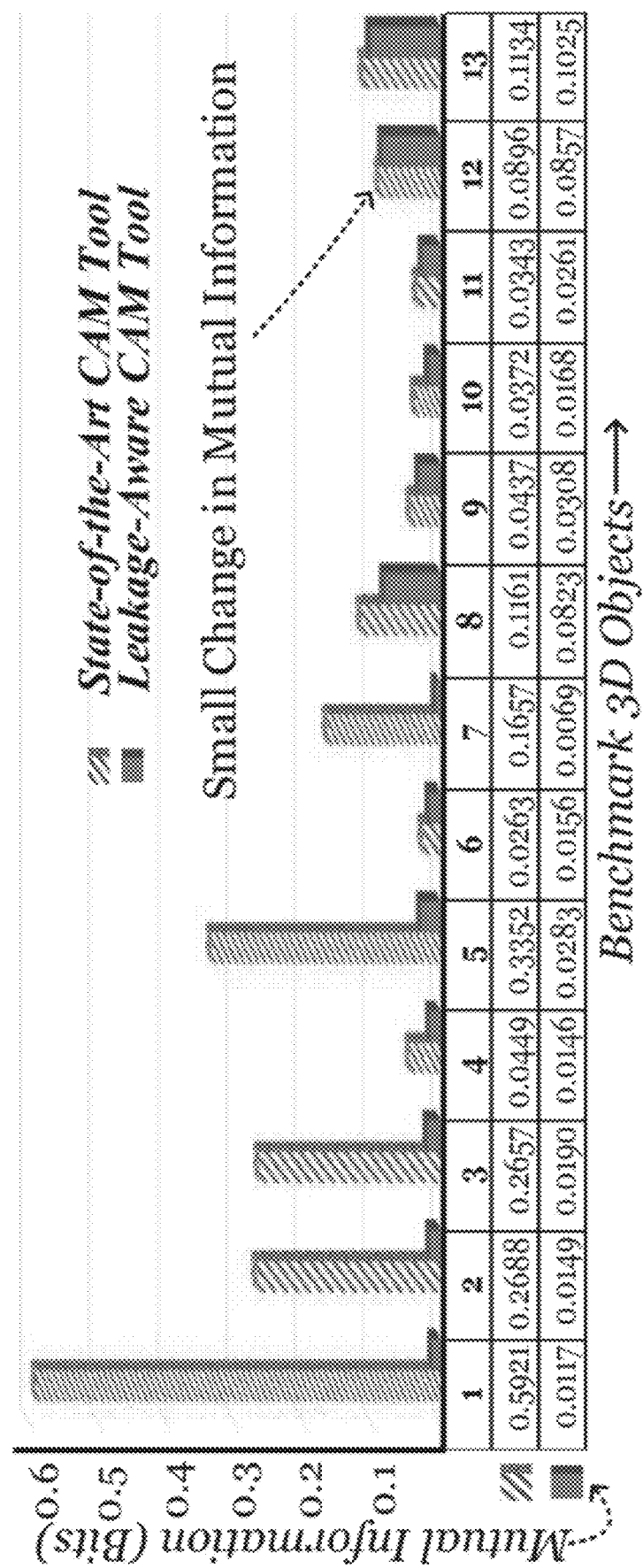
FIG. 22 shows a graph of mutual information between G-codes of benchmark 3D models and vibration side-channel.

For vibration side-channel, the average drop of 55.65% in mutual information is obtained across all the benchmark models (see FIG. 22). This drop in mutual information is highest among all the side-channels. This result corroborates the analysis presented in Section III-A. Optimizing the design variables $\gamma$ and $\upsilon$ affects the vibration side-channel the most. Provided the fact, there are more design variables and machine specific process parameters that may be tuned to reduce the mutual information, design space exploration of such variables may be performed to drastically reduce the mutual information from all the side-channels. Similar to acoustic side-channel, it also has relatively small change in mutual information for object 12.

Figure 23:
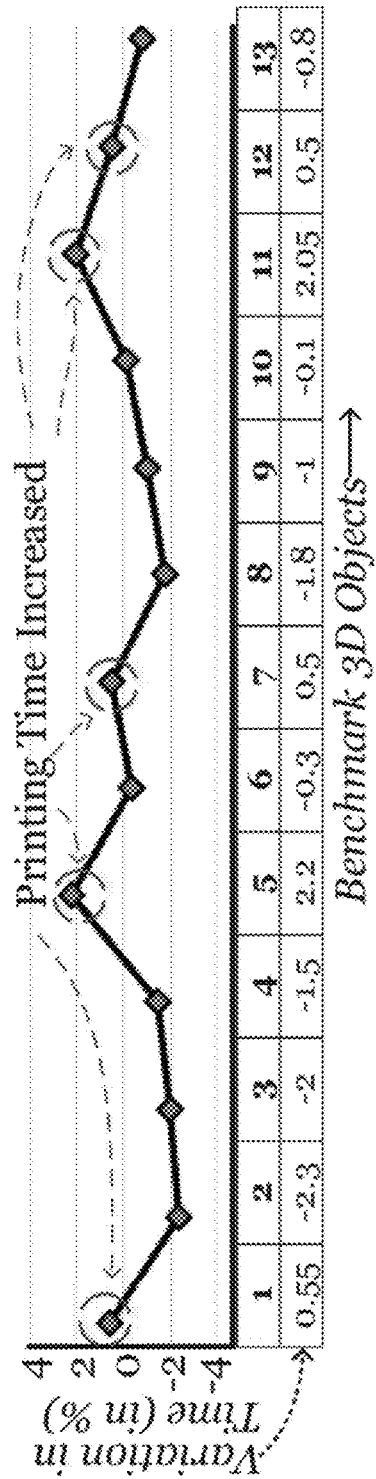
FIG. 23 shows a graph of the variation in printing time of a leakage-aware CAM tool compared to the state-of-the-art.

FIG. 23 shows the timing variation between the state-of-the-art CAM tool and the leakage-aware CAM tool expressed in terms of percentage increase or decrease in the printing time. It can be seen that for the given benchmark 3D objects, the maximum increase in the printing time was 2.2%.

IV. CASE STUDY WITH AN ATTACK MODEL

The mutual information provides the system designers about the amount of information that be deduced about the G/M-code from the analog emissions. However, the success rate in reconstructing the G/M-code also highly depends on the capability of an attacker. A strong attacker (with domain knowledge, large computing capability, and some high-level access to the digital process chain of the target 3D printer) may be able to achieve higher success rate with low mutual information. The present example does not provide exhaustive analysis of the success rate based on various capability of an attacker. Rather, the present example uses the attack model presented Section II-B, which has also been used in previous works.

A. Success Rate Calculation

In the attack model, an attacker will utilize leakage from all the size-channels to infer about various G-codes using a function $\hat{f}(\bullet, \alpha)$. Moreover, each parameters of the G-code such as $\theta$ and $\upsilon$ is estimated using functions $\hat{\theta}_k = \hat{f}(l_{(1, k)}, l_{(2, k)}, l_{(3, k)}, l_{(4, k)})$ and $\hat{d}_k = \hat{f}_d(l_{(1, k)}, l_{(2, k)}, l_{(3, k)}, l_{(4, k)})$. Since G/M-code consists of various information about the line-segment, it becomes intuitive to have multiple functions estimating these parameters, and later combine them together to reconstruct the line-segment. As a test case study, a machine learning algorithm called Random Forest is used to estimate the functions $\hat{f}_\theta(\bullet, \alpha)$ and $\hat{f}_d(\bullet, \alpha)$, and the success rate is calculated using Equation 19 for various values of $e_l$ ranging from 0 to 10 mm with step size of 0.5 mm. As mentioned in Section II-D, Equation 19, measures the average success rate in reconstructing the line-segment defined by the G/M-code. The error threshold $e_l$ corresponds to the combined error in predicting the length d of the line-segment and the angle $\theta$ made with the X-axis. For feature, an attacker extracts the power spectral density values from all the side-channels. These features are then fused together and passed to the random forest algorithms for estimating the functions. By combining the features from all the side-channels, the estimated function effectively selects the channel that gives more information about the d and $\theta$. During the training phase, 75% of the benchmark models are used to gather analog emissions from the side-channel, estimate the functions, and the rest of the benchmark model's G-code is predicted using these functions. Since an attacker has high-level access to the 3D printer, he/she may be able to acquire unlimited training data. However, for feasibility and variation in training data, we have selected the benchmark models were selected, and divided into test and training to mimic the two phases of the attack model.

Figure 24:
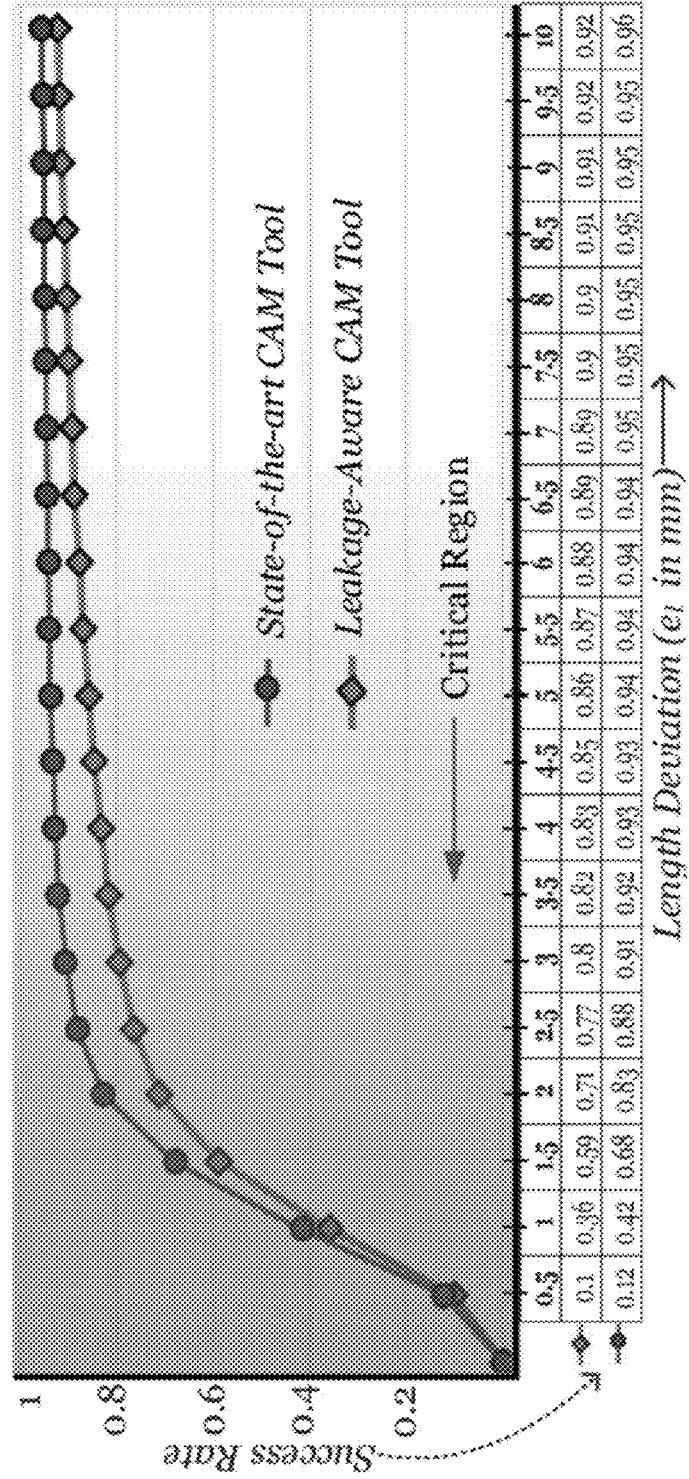
FIG. 24 shows a graph of the average success rate for G-code reconstruction with varying $e_t$.

The average success rate for reconstruction of the line-segments described by the G/M-code for varying ranges of $e_l$ is shown in FIG. 24. It can be observed that compared to the state-of-the-art CAM tool the success rate of an attacker in reconstructing the line-segment is less in the leakage-aware CAM tool. The success rate reduction across the ranges of $e_l$=0 to 10 mm is 8.74%. Moreover, the reduction in success rate is more than 10%, when 0 mm<$e_l$≤5 mm. This is the critical region for $e_l$, as an attacker may acquire accurate geometry information easily without further post processing in this range. The success rate calculated here is in reconstructing the individual line-segments. This still does not explain the accuracy in overall 3D object reconstruction. For reconstructing the 3D object, an attacker will have to use post processing to reconstruct the 3D object layer-by-layer, using the estimated line-segments. This post-processing depends on the capability of an attacker, and is out of scope of this paper. However, with higher success rate in each of the line-segment, an attacker will have to use less post-processing in reconstructing the 3D object, hence reduction of the success-rate for each the line-segments still helps in obfuscating the intellectual property of the object.

B. Test Case with Reconstruction

Figure 25:
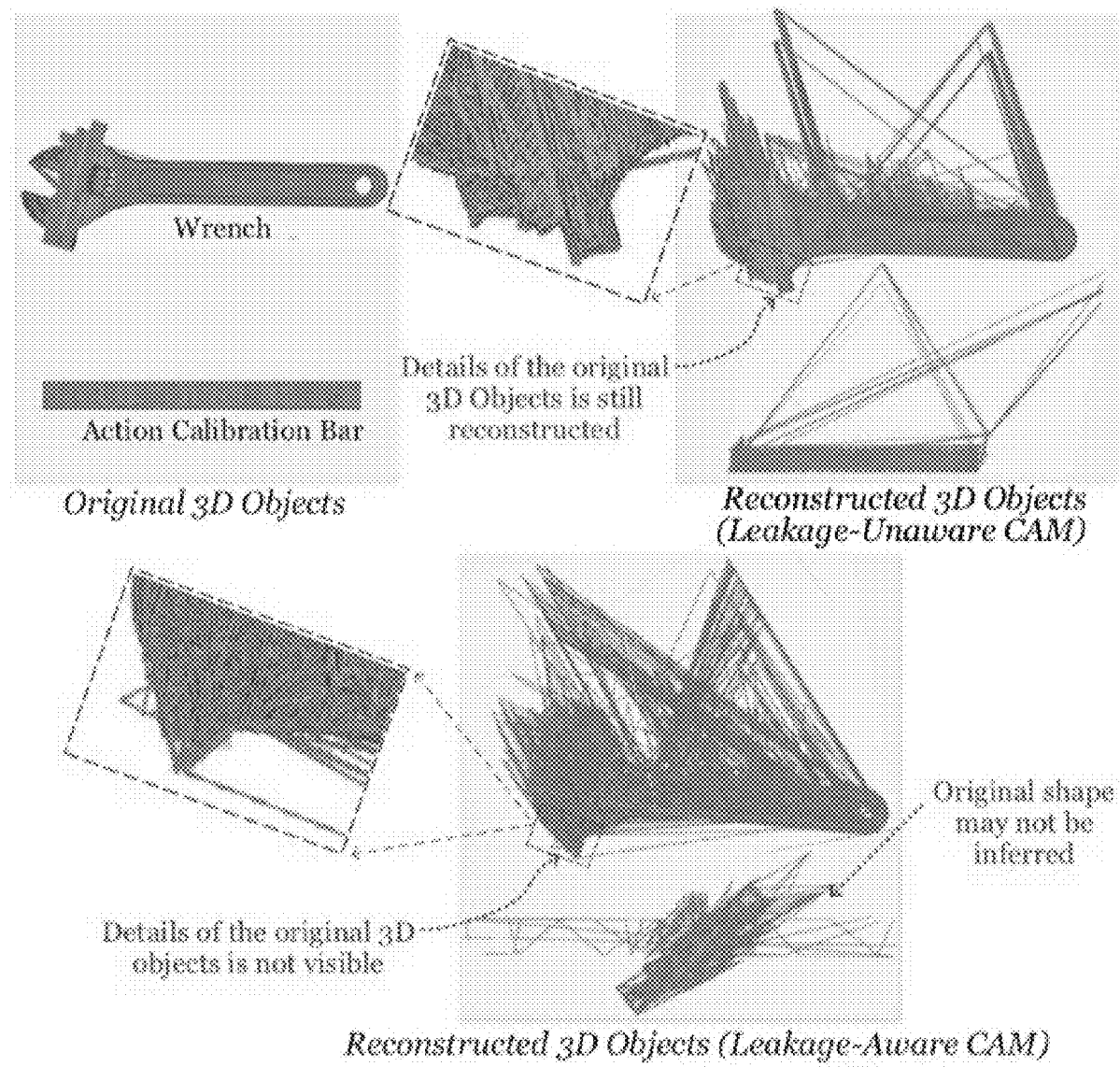
FIG. 25 shows depictions of reconstructed and traced G-codes of test case objects, with and without a leakage-aware CAM tool.

In this section, a simple post-processing is applied to visualize the effect of decrease in mutual information and success rate on reconstruction of the 3D objects (after the G-code prediction). The predicted line-segments described by G/M-code from the previous section is used for the 3D object reconstruction. This procedure is carried out for the G/M-codes produced by the state-of-the-art CAM tool (Cura), and the leakage-aware CAM tool. The two test objects chosen have relatively simple (for action calibration or bar) and complex (for printable wrench) structures. The result of reconstruction of the test objects for leakage-aware and leakage-unaware CAM tool is shown in FIG. 25.

The post processing used involved using the same M-codes generated for the training objects on the test objects as well. During a real attack, an attacker is assumed to have some information about the M-codes of the target 3D printer. As M-codes are machine specific parameters such as extruder and bed temperature, alignment of the printing bed, etc. These parameters are normally set to an optimal constant value for a given 3D printer. This makes sure the quality is maintained. And attacker, during training phase, has access to the digital process chain of the profiling 3D printer, which is assumed to be similar in build to the target 3D printer. Hence, he/she can use the machine specific information as a post processing step for reconstruction of the 3D objects. From FIG. 25, it can be observed that the objects reconstructed from emission captured from the side-channels, when state-of-the-art CAM tool is used, consists of relatively higher amount of details. On the other hand, the geometry details of the objects are not reconstructed when the leakage-aware CAM tool is used. Without using the leakage-aware CAM tool, it can be observed that in Printable Wrench, the details of the outline can still be reconstructed. The obfuscation correlates to the amount of decrease in the mutual information and the success rate. For instance, the action calibration bar (object 5), which has larger drop in mutual information (compared to object 9), caused the reconstruction to be distorted (making it look nothing like the original shape). This can limit the attacker's capability to steal the valuable intellectual property inherent in the detailed geometry design, thus preventing the intellectual property theft.

V. DISCUSSION

A. Positioning of the Sensors

The sensors position, number, and orientation may be varied and may affect the outcome of the method. An effective attacker may surreptitiously place multiple sensors for data acquisition which may aid in reconstruction. Moreover, to explore the position of sensors to acquire better emission signals may aid in improving the performance of leakage-aware CAM tool as well. In the present example, the sensors were placed in location that is non-intrusive to the printing process, such as stationary base of the 3D printer for vibration sensor, stable ground for magnetic sensors, and X, Y, and Z-axes for acoustic sensors.

B. 3D Printer Variation

Since the attack model relies on analog emissions that behave as side-channels, it highly depends on the mechanical structure of the 3D printer. Researchers have tested the effectiveness of the attack model using fused deposition modeling based 3D printers, especially the system with Cartesian movement. Since these printers have similar mechanical build, the same approach of the estimating the G/M-code may work, however, this needs to be tested for 3D printers with other mechanical build types (such as polar, delta, etc.) and technologies (such as Stereolithography, Selective Laser Sintering. Digital Light Processing, etc.)

C. Optimization Constraints and Design Variables

The design variables such as orientation γ and speed υ do not increase the printing time of the 3D model. However, the test case reconstruction shows that, some geometry information is still reconstructed even after the leakage-aware CAM tool is used. Hence, more design variables may be used in the additive manufacturing domain. These design variables, however, cannot increase various optimization constraints or affect the quality of the 3D objects. Moreover, the same design variables may be able to decrease the mutual information drastically provided the optimization constraints are relaxed. In this way the trade-off between confidentiality and the optimization constraints (such as printing time) may be handled. Furthermore, the present example demonstrates the possibility of reduction in mutual information and the success-rate in reconstruction of the 3D object using just two design variables. A 10% reduction in success rate may not be able to completely hide the geometry (specifically the larger outlines in FIG. 25) of the 3D objects. However, provided the fact that there are many design variables (both in object specific G-codes and machine specific M-codes), the methodology of the present invention can easily be extended to achieve higher level of obfuscation in geometry.

D. Formulation of Success Rate for IP Theft

The presented success rate was based on reconstruction of the individual G/M-code line-segments. However, for success rate in stealing the intellectual property of the 3D object, a proper metric incorporating the capability of an attacker may be necessary. Nonetheless, the propose leakage-aware CAM tool helps in reducing the mutual information, and increasing the cost for reconstruction for an attacker.

VI. CONCLUSION

The present example features a novel methodology to improve the confidentiality of the cyber-physical manufacturing systems. This is achieved by incorporating leakage-aware computer aided manufacturing tools such as slicing algorithm and tool-path generation algorithm. This cross-domain security solution takes the feedback from the physical domain, and optimizes the cyber-domain design variables (orientation and speed) to minimize the mutual information between the cyber-domain G/M-codes and the physical domain analog emissions. For various benchmark 3D models, our solution obtains an average mutual information reduction of 24.94% in acoustic side-channel, 32.91% in power side-channel, 32.29% in magnetic side-channel, and 55.65% in vibration side-channel of the fused-deposition modeling based Cartesian 3D printer. To validate the proposed methodology, a case study with an attack model is used to calculate the success rate. For various threshold of G/M-code reconstruction, the average drop in success rate obtained is 8.74%. In the present example, the capability of a leakage-aware cyber-domain computer aided manufacturing tool to maintaining the confidentiality of the system without physical system modification is highlighted.

Physics-Based Equations

This section presents physics-based equations to explain the underlying relation between the cyber-domain data (G/M-code) and physical-domain data (side-channel emissions). Moreover, the section justifies the possibility of the information leakage from the various side-channels (vibration, acoustic, power, and magnetic). The major source of vibration and acoustics may be explained by understanding the dynamic model of the 3D printer. In this example, we present the analysis for fused deposition modeling technique based Cartesian 3D printer. It has three Degrees of Freedom (DOF) for the extruder. There are minimum three stepper motors that move the nozzle in the corresponding axis. The extruder consists of a stepper motor that pushes the thermoplastic through the heating filament present in the nozzle. 3D printers realize the three DOF in various ways. Considering the nozzle as the end-effector, and the base plate as a point of reference, the 3D printer consists of three kinematic chains, each consisting of a prismatic actuator (stepper motors). The generalized position of the end-effector can be represented by $q=[q_x, q_y, q_z]$, where $q \in R^{n \times 1}$, and $q_x$, $q_y$, and $q_z$ are the joint position of each of the joints (x, y and z axis). Since the joint is prismatic, $q_{i \in (x, y, z)} = d_i$, where $d_i$ corresponds to displacement of the joint in each axis. The end-effector cartesian coordinate (x, y, z) is function of the generalized position q. Then, the general dynamics equation of the 3D printer can also be written as follows:

$$M(q)\ddot{q} + C(q,\dot{q})\dot{q} + g(q) + f(\tau,\dot{q}) = \tau \quad (20)$$

where, $M(q) \in R^{n \times 1}$ is an inertial matrix, $C(q, \dot{q}) \in R^{n \times n}$ is the torque matrix, and $g(q) \in R^{n \times 1}$ is the vector gravity torque. When G/M-codes are sent to the 3D printer, it needs to actuate the stepper motors to print the desired line-segment. To produce the torques necessary for moving the nozzle, current is supplied in the coils of the stepper motors. The magnitude and phase of current, however, depends on the various G/M-codes given to the 3D printer. For example, increasing the speed increases the rate of supply of constant current. Changing the movement from single axis to multiple axis increases the total current consumed by the stepper motors. Hence, the power measurement of the 3D printer may leak some information about the G/M-codes.

Considering two phase hybrid stepper motors, the total torque produced by the motor due to the current $i_A$ and $i_B$ passing in the two phases can be calculated as follows:

$$\tau = -p\Psi_m i_A \sin(p\theta) - p\Psi_m i_B \sin(p\theta - \lambda) \quad (21)$$

where $\Psi_m$ is the maximum stator flux linkage, p is the number of rotor pole pairs, λ is the angle between the two stator windings, and θ is the mechanical rotational angle. The mechanical rotational angle for different stepper motors (responsible for movement in X, Y, and Z-axes) are different due to difference in the load attached to the rotor shaft. This may cause the current measurements to slightly vary when G/M-codes print the line-segment with varying angle.

In the dynamic model of the 3D printer, the frequency response of the 3D printer due to the applied torque and the corresponding frequency present in each joint is explained. However, the stator of the stepper motor in each of the axis also vibrates due to the fluctuating radial electromagnetic force on the stator. From Maxwell stress tensor, the magnitude of the radial force per unit area at any point of the air gap can be given as follows:

$$\sigma = \frac{b_n^2 - b_t^2}{2\mu_o} \quad (22)$$

where $b_t$ is the tangential air-gap flux density, $b_n$ is radial air-gap flux density, and $\mu_o$ is the permeability of the free space. The magnetic flux density is the function of current flowing through the stator, number of windings turns in each stator core, magnetic flux path length, etc. This radial forces per unit area can be abstracted and expressed as follows:

$$p_r(\alpha,t)=P_r \cos(r\alpha-\omega_r t) \qquad (23)$$

where r is the order of the force wave, $\omega_r$ is the angular frequency of the force of the $r_{th}$ order, $\alpha$ is the angular distance from the given axis, and $P_r$ is the amplitude of the radial force pressure in N/m². Each of the stepper motors used in the 3D printer is a source of vibration with its own stator natural frequency expressed as follows:

$$f_r \approx \frac{1}{2\pi}\sqrt{\frac{K_r + K_r^f + K_r^\omega}{M + M_f + M_\omega}} \qquad (24)$$

where $K_r$, $K_r^\omega$, and $K_r^f$ is the lumped stiffness of the stator, tooth-slot zone including winding, and frame where stepper motor is connected, respectively. M, $M_\omega$, and $M_f$ are the mass of the stator core, winding, and frame, respectively. Next, assuming, the transfer path for various components of the 3D printer to be linear, transfer path analysis method can be used to determine the sound pressure spectrum at point i due to a force acting upon point j, in direction k as follows:

$$p_{ijk}(\omega)=H_{ijk} \cdot F_{jk}(\omega) \qquad (25)$$

where $H_{ijk}$ is the frequency response function between point i and j, $F_{jk}$ is the force spectrum at point j. Then the sound pressure, only considering the prismatic DOF, at point i is obtained as follows:

$$p_i(\omega) = \sum_{j=1}^{N}\sum_{k=1}^{3} H_{ijk} \cdot F_{jk}(\omega) \qquad (26)$$

Equation 26, will be able to explain the relationship between the G/M-code and the vibration and acoustic emissions from the system measured at point i. However, Equation 26 becomes complex when revolute DOFs is considered, and solving these complex equations is non-trivial. Hence, the attack model considers an attacker to use data-driven modeling approach in extracting the relationship between the G/M-code and the analog emissions for reverse engineering the 3D object from the side-channels.

As used herein, the term "about" refers to plus or minus 10% of the referenced number.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. Reference numbers recited in the claims are exemplary and for ease of review by the patent office only, and are not limiting in any way. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting of", and as such the written description requirement for claiming one or more embodiments of the present invention using the phrase "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. A method of protecting a cyber-physical additive manufacturing ("AM") system from information leakage, wherein the AM system comprises a cyber-domain, wherein a G-code resides in the cyber domain, wherein the G-code comprises a set of design variables, and a physical domain, comprising a manufacturing machine wherein the manufacturing machine has a plurality of side channels, wherein the plurality of side channels have analog emissions, wherein the analog emissions depend on control signals, wherein the G-code comprises an instruction to the manufacturing machine, wherein the G-code is converted by the cyber domain into a set of the control signals in the physical domain, wherein the control signals depend on the set of design variables of the G-code, wherein the execution of the control signals causes the AM system to emit the analog emissions in the plurality of side channels in the physical domain, wherein physical properties of the analog emissions in the side channels depend on the composition of the control signals being executed, wherein the set of design variables influence the physical properties of the analog emission, the method comprising:

(a) obtaining a benchmark G-code, wherein the benchmark G-code has an initial set of values for the set of design variables;

(b) obtaining an estimated G-code for the initial set of values for the set of design variables by:

i. executing the benchmark G-code on the AM system, wherein the benchmark G-code is converted to the control signals, wherein the control signals are executed by the AM system;

ii. measuring the analog emissions from the plurality of side channels while the benchmark G-code is executing;

iii. repeating steps (i) and (ii) for a plurality of benchmark G-codes and corresponding control signals, while training a supervised learning algorithm to learn an estimation function, wherein the estimation function estimates control signals of each G-code of the plurality of benchmark G-codes from a plurality of analog emissions:

iv. executing at least one subsequent G-code on the AM system:

v. observing at least one subsequent set of analog emissions from the plurality of side channels:

vi. using the estimation function to estimate at least one subsequent set of control signals from the at least one subsequent set of analog emissions; and vii. computing an estimated G-code from the estimated at least one subsequent set of control signals;

(c) using the benchmark G-code and the estimated G-code to compute a mutual information value for the set of design variables, wherein the mutual information is a measure of how accurate the estimated G-code is compared to the benchmark G-code;

(d) modifying the set design variables of the G-code to obtain a modified G-code and a modified set of control signals;

(e) repeating steps (b) through (d) a plurality of times, to obtain a plurality of mutual information values for each of a plurality of sets of design variables, wherein the plurality of sets of design variables spans the set of design variables;

(f) selecting the set of design variables corresponding to the minimum mutual information, to obtain an optimal set of design variables;

(g) for each future G-code to be executed on the AM system, modifying the set of design variables to the optimal set of design variables to obtain a leakage optimized G-code; and (h) executing the leakage optimized G-code on the AM system.

* * * * *